(12) United States Patent
Kato et al.

(10) Patent No.: US 10,460,414 B2
(45) Date of Patent: Oct. 29, 2019

(54) DIGITAL WATERMARK INFORMATION DETECTING DEVICE AND DIGITAL WATERMARK INFORMATION DETECTING METHOD

(71) Applicant: FUJITSU LIMITED, Kawasaki-shi, Kanagawa (JP)

(72) Inventors: Keizo Kato, Kawasaki (JP); Kensuke Kuraki, Ichikawa (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 382 days.

(21) Appl. No.: 15/398,065

(22) Filed: Jan. 4, 2017

(65) Prior Publication Data
US 2017/0116697 A1 Apr. 27, 2017

Related U.S. Application Data

(63) Continuation of application No. PCT/JP2014/068743, filed on Jul. 14, 2014.

(51) Int. Cl.
*G06T 1/00* (2006.01)
*H04N 1/387* (2006.01)
(Continued)

(52) U.S. Cl.
CPC .......... *G06T 1/0071* (2013.01); *G06T 1/0085* (2013.01); *H04N 1/387* (2013.01);
(Continued)

(58) Field of Classification Search
CPC ..... G06T 2201/0051; G06T 2201/0061; G06T 1/0071; G06T 2201/0065; G06T 1/0085; H04N 19/467; H04N 1/387; H04N 5/74
See application file for complete search history.

(56) References Cited

U.S. PATENT DOCUMENTS 6,930,803 B1 * 8/2005 Suzuki .................. G06T 1/0021
358/426.04
7,706,565 B2 * 4/2010 Levy ........................ G06K 7/12
348/460
(Continued)

FOREIGN PATENT DOCUMENTS

EP 2 551 816 A1 1/2013
JP 2003-179556 6/2003
(Continued)

OTHER PUBLICATIONS

Extended European Search Report dated Jun. 8, 2017 in corresponding European Patent Application No. 14897784.6.
(Continued)

*Primary Examiner* — Shaghayegh Azima

(57) ABSTRACT

A detecting device divides image data into a plurality of areas, wherein the image data is projected by a projecting device and the image data has a plurality of sets of watermark information, in each of which frequency and amplitude are constant and in each of which phase is reversed depending on whether first-type information or second-type information is indicated, and the plurality of sets of watermark information are embedded in the image data in a synchronized manner. The detecting device extracts amplitude of the watermark information included in the areas and identifies, as a target area for extraction, successive areas in which the extracted amplitude of the watermark information is constant. The detecting device extracts the watermark information which is overlapping in the target area for extraction.

3 Claims, 20 Drawing Sheets

(51) Int. Cl.
  *H04N 5/74* (2006.01)
  *H04N 19/467* (2014.01)

(52) U.S. Cl.
  CPC ............ *H04N 5/74* (2013.01); *H04N 19/467* (2014.11); *G06T 2201/0051* (2013.01); *G06T 2201/0061* (2013.01); *G06T 2201/0065* (2013.01)

(56) References Cited

U.S. PATENT DOCUMENTS

| | | | | |
|---|---|---|---|---|
| 2002/0076084 | A1* | 6/2002 | Tian | G06T 1/0042 382/100 |
| 2002/0157005 | A1* | 10/2002 | Brunk | G06Q 20/401 713/176 |
| 2002/0199106 | A1* | 12/2002 | Hayashi | G06T 1/005 713/176 |
| 2003/0058262 | A1 | 3/2003 | Sato et al. | |
| 2003/0231768 | A1* | 12/2003 | Fletcher | G06T 1/005 380/205 |
| 2005/0180596 | A1* | 8/2005 | Abe | G06T 1/0021 382/100 |
| 2006/0204030 | A1* | 9/2006 | Kogure | G06T 1/0064 382/100 |
| 2007/0014428 | A1* | 1/2007 | Kountchev | G06T 1/0028 382/100 |
| 2008/0080009 | A1 | 4/2008 | Masui et al. | |
| 2012/0163583 | A1 | 6/2012 | Nakagata et al. | |
| 2012/0163653 | A1* | 6/2012 | Anan | H04N 19/467 382/100 |
| 2012/0243727 | A1* | 9/2012 | Hwang | G06T 1/0085 382/100 |
| 2013/0028465 | A1* | 1/2013 | Kuraki | G06T 1/0085 382/100 |
| 2013/0170695 | A1* | 7/2013 | Anan | G06T 1/0021 382/100 |
| 2014/0016817 | A1* | 1/2014 | Nakagata | H04N 19/467 382/100 |

FOREIGN PATENT DOCUMENTS

| | | |
|---|---|---|
| JP | 2005-176257 | 6/2005 |
| JP | 2005-176258 | 6/2005 |
| JP | 2005-277732 | 10/2005 |
| JP | 2007-295490 | 11/2007 |
| JP | 2008-35154 | 2/2008 |
| JP | 2008-85695 | 4/2008 |
| JP | 2009-124533 | 6/2009 |
| JP | 2012-142741 | 7/2012 |
| JP | 2013-30974 | 2/2013 |
| WO | WO 2010/062290 A1 | 6/2010 |

OTHER PUBLICATIONS

International Search Report dated Sep. 16, 2014 in corresponding International Application No. PCT/JP2014/068743**.
Office Action dated Feb. 25, 2019 in corresponding European patent application No. 14897784.6 (6 pages).

* cited by examiner

FIG.20
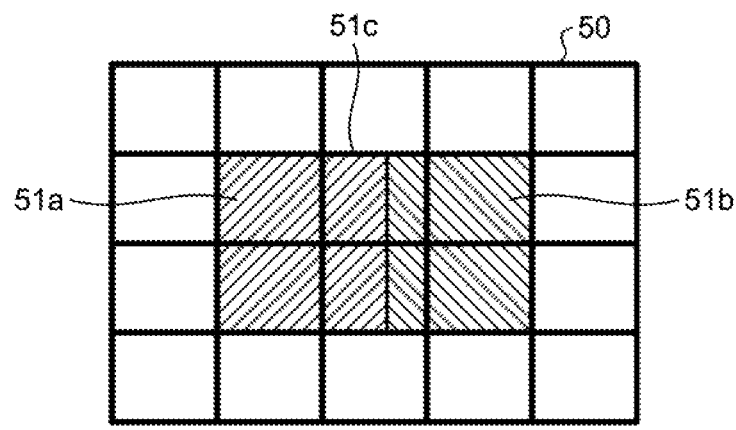
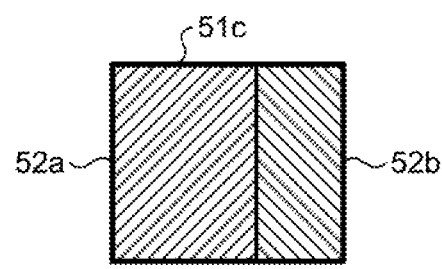

DIGITAL WATERMARK INFORMATION DETECTING DEVICE AND DIGITAL WATERMARK INFORMATION DETECTING METHOD

CROSS-REFERENCE TO RELATED APPLICATION

This application is a continuation application of International Application PCT/JP2014/068743 filed on Jul. 14, 2014 and designates U.S., the entire contents of which are incorporated herein by reference.

FIELD

The present invention relates to a digital watermark detecting device.

BACKGROUND

In recent years, the digital watermark technology has become popular for the purpose of embedding information in digital contents such as videos. For example, in conventional technology 1, a technology is disclosed in which digital watermark information is embedded in a video, and a user captures the video using a dedicated camera of a smartphone or the like and extracts the information embedded in the video.

If conventional technology 1 is implemented in a lighting device such as a projector, it is possible to think of a business model in which a light having digital watermark information embedded therein is projected and the smartphone of a user is instructed to detect the information embedded in the projected light.

In the case in which a lighting device projects a plurality of lights having different sets of digital watermark information embedded therein, when the areas of projection of the lights come close to each other, the sets of digital watermark information interfere with each other thereby leading to a decline in the detection accuracy of the information embedded in the lights. In order to deal with that issue, conventional technology 2 and conventional technology 3 are available.

FIG. 25 is a diagram for explaining conventional technology 2. As illustrated in FIG. 25, at the time of emitting a light in which digital watermark information is embedded, and projecting an image 11; a lighting device 10 superimposes a frame 11a onto the image 11. As a result of superimposing the frame 11a, the target area for information extraction becomes clear.

FIG. 26 is a diagram for explaining conventional technology 3. In conventional technology 3, a moving image is divided into small areas, and bit determination is performed based on the luminance variation in each small area. In the example illustrated in FIG. 26, small areas 20a and 20b are formed; and bit determination regarding the small area 20a is performed based on the luminance variation thereof, while bit determination regarding the small area 20b is performed based on the luminance variation thereof.

Patent Literature 1: Japanese Laid-open Patent Publication No. 2012-142741
Patent Literature 2: Japanese Laid-open Patent Publication No. 2005-277732
Patent Literature 3: Japanese Laid-open Patent Publication No. 2003-179556

However, in the conventional technology described above, when a plurality of sets of image data is emitted with embedding information embedded therein and when different sets of embedding information interfere with each other, the area onto which only particular embedding information is superimposed cannot be identified and thus information cannot be obtained.

For example, conventional technology 2 is effective in the case in which only a single light is emitted. However, if a plurality of images gets superimposed, there are times when a plurality of frames is generated. In such a case, it is not possible to identify the area onto which only particular embedding data is superimposed. Moreover, in conventional technology 2, since a frame is superimposed onto an image, it causes disfigurement too.

In conventional technology 3, it is assumed that the embedding information has a high degree of strength. Thus, when there is only minute variation per area as is the case in the digital watermarking technology, it becomes difficult to read information from small areas. For that reason, the signal range of each area needs to be identified and detection needs to be performed using the variation preferably over a wider area. However, in conventional technology 3, it is not possible to resolve such issues.

SUMMARY

According to an aspect of an embodiment of the invention, a digital watermark information detecting device includes a processor that executes a process including: dividing image data into a plurality of areas, wherein the image data is projected by a projecting device and the image data has a plurality of sets of watermark information, in each of which frequency and amplitude are constant and in each of which phase is reversed depending on whether first-type information or second-type information is indicated, and the plurality of sets of watermark information are embedded the image data in a synchronized manner; first extracting amplitude of the watermark information included in the areas; identifying, as a target area for extraction, successive areas in which the extracted amplitude of the watermark information is constant; and second extracting the watermark information which is overlapping in the target area for extraction.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 20 is a diagram (3) illustrating an example of image data that has been divided into a plurality of small areas.

DESCRIPTION OF EMBODIMENTS

Exemplary embodiments of a digital watermark information detecting device and a digital watermark information detecting method according to the present invention are described below in detail with reference to the accompanying drawings. However, the present invention is not limited by those embodiments.

[a] First Embodiment

In a first embodiment, an embedding device generates two types of visual information having two types of digital watermark information embedded therein, and projects an image corresponding to each set of the visual information onto a predetermined area. Then, a detecting device captures the projected images and, based on the visual information of the captured images, detects the information embedded in the visual information. The detecting device represents an example of a digital watermark information detecting device.

Figure 1:
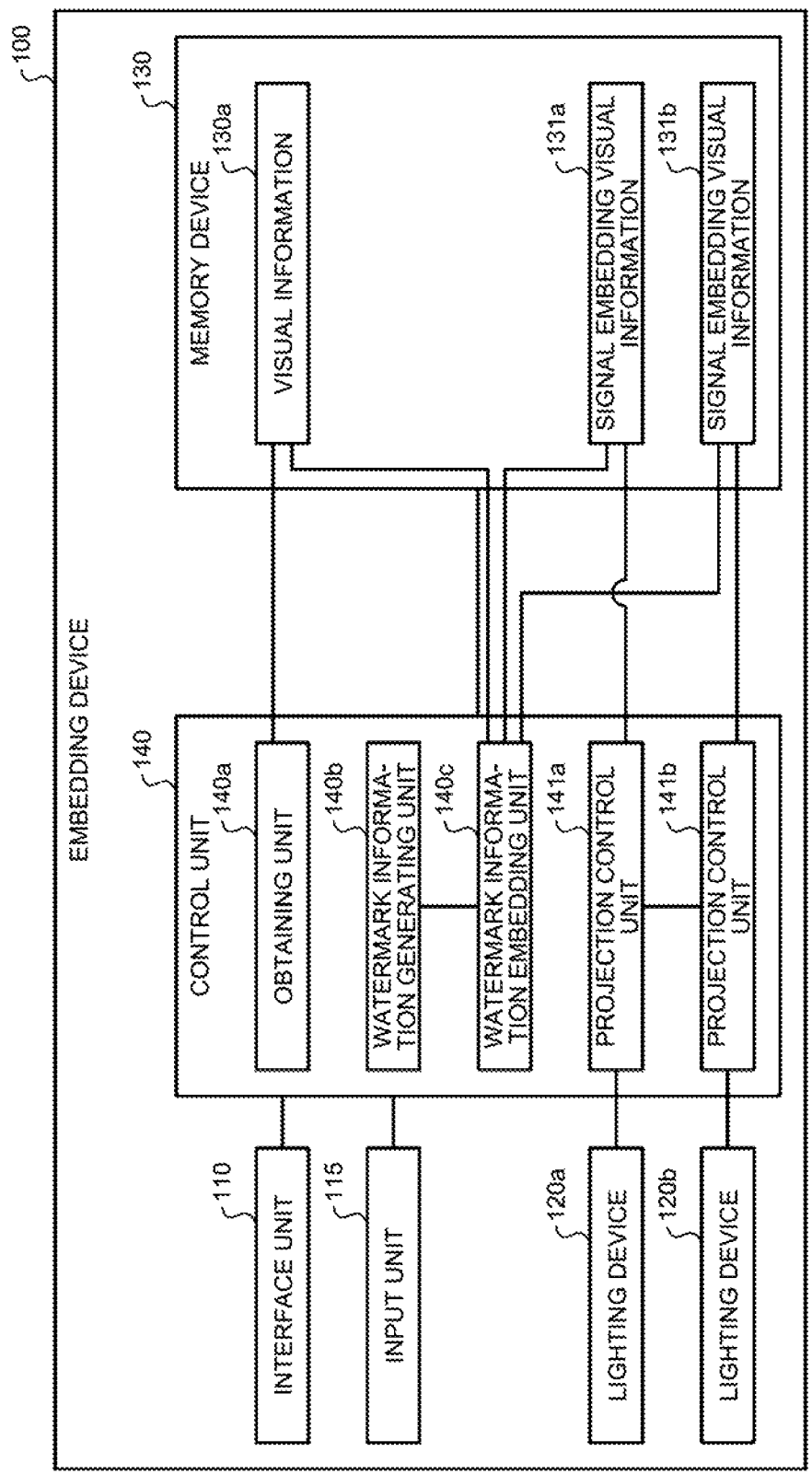
FIG. 1 is a functional block diagram illustrating a configuration of an embedding device according to a first embodiment.

Given below is the explanation of a configuration of the embedding device according to the first embodiment. FIG. 1 is a functional block diagram illustrating a configuration of the embedding device according to the first embodiment. As illustrated in FIG. 1, an embedding device 100 includes an interface unit 110, an input unit 115, lighting devices 120a and 120b, a memory unit 130, and a control unit 140.

The interface unit 110 is a device that, for example, obtains visual information from a video input device such as a camcorder via a communication network or a communication cable. Then, the interface unit 110 outputs the obtained visual information to an obtaining unit 140a.

The input unit 115 is an input device used to input a variety of information to the embedding device 100. For example, the input unit 115 corresponds to a keyboard, a mouse, or a touch-sensitive panel.

The lighting devices 120a and 120b correspond to, for example, projectors. In the following explanation, the lighting devices 120a and 120b are collectively referred to as lighting devices 120. Each lighting device 120 is a device that obtains visual information having digital watermark information embedded therein from the control unit 140, and projects a video corresponding to the obtained visual information onto a predetermined area. Herein, the predetermined area corresponds to a large screen, for example. In the example illustrated in FIG. 1, although only the lighting devices 120a and 120b are illustrated, the embedding device 100 may include other lighting devices too.

The memory unit 130 is used to store visual information 130a and signal embedding visual information 131a and 131b. For example, the memory unit 130 corresponds to a semiconductor memory element such as a RAM (Random Access Memory), a ROM (Read Only Memory), or a flash memory; or corresponds to a memory device such as an HDD (Hard Disk Drive).

The visual information 130a represents information of digital contents expressed in the form of moving images. For example, the visual information 130a represents information obtained from a video input device. The visual information 130a can be information about any type of video. For example, the visual information 130a can be information about a video in which an object captured in the video moves with time, or can be information about a video in which still images are displayed in succession.

The signal embedding visual information 131a and 131b corresponds to information obtained by embedding digital watermark information in the visual information 130a. In the first embodiment, the digital watermark information embedded in the signal embedding visual information 131a is assumed to be different than the digital watermark information embedded in the signal embedding visual information 131b.

The control unit 140 includes the obtaining unit 140a, a watermark information generating unit 140b, a watermark information embedding unit 140c, and projection control units 141a and 141b. The control unit 140 corresponds to, for example, an integrated device such as an ASIC (Application Specific Integrated Circuit), or an FPGA (Field Programmable Gate Array). Alternatively, the control unit 140 corresponds to, for example, an electronic circuit such as a CPU (Central Processing Unit) or an MPU (Micro Processing Unit).

The obtaining unit 140a is a processing unit that obtains visual information from a video input device via the interface unit 110, and stores the obtained visual information as the visual information 130a in the memory unit 130. Meanwhile, the obtaining unit 140a can obtain visual information also from an external device via a communication network, and store the obtained visual information in the memory unit 130.

The watermark information generating unit 140b is a processing unit that generates a watermark pattern corresponding to digital watermark information. The watermark information generating unit 140b outputs the information about the generated watermark pattern to the watermark information embedding unit 140c. For example, a watermark pattern is a set of one or more watermark blocks. Each watermark block includes one or more pixels and has, for example, a rectangular shape. The pixels included in a watermark block have a particular value other than zero. For example, the particular value can be "n" or "−n". Herein, n is an integer other than zero.

The watermark information generating unit 140b periodically increases or reduces the number of watermark blocks in chronological order. As a result of an increase or a decrease in the number of watermark blocks, the area of the watermark pattern also increases or decreases. By associating the periodical changes in the area of the watermark pattern with bits "0" or bits "1", the digital watermark information expresses a bit sequence. For that reason, depending on whether the information expressed as digital watermark information represents bits "0" or bits "1", the watermark information generating unit 140b varies the phase of periodical temporal variation of the area of the watermark pattern. Herein, the information of the bit sequence is assumed to be set in advance.

Figure 2:
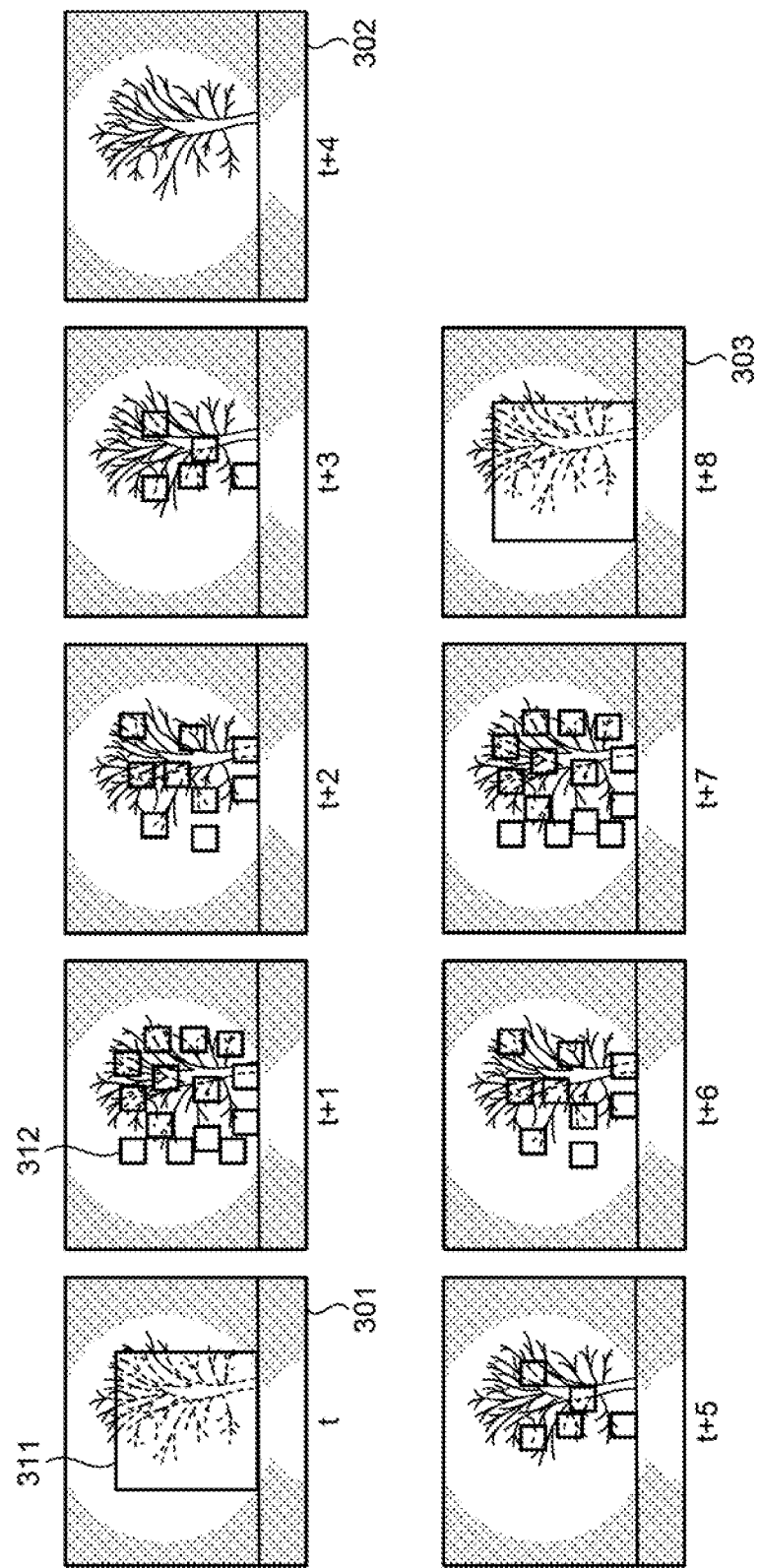
FIG. 2 is a diagram illustrating an example of the temporal variation in a single period of a watermark pattern.

FIG. 2 is a diagram illustrating an example of the temporal variation in a single period of a watermark pattern. In the example illustrated in FIG. 2, the pixels in each block of the watermark pattern hold "2" as the particular value. When the pixels included in the watermark pattern are superimposed, the value of the superimposed pixels becomes greater than the original pixel value.

In FIG. 2, nine temporally-continuous images are illustrated from a timing t to a timing t+8. On an image 301 at the timing t, a rectangular watermark pattern 311 is superimposed. Then, from the timing t to the timing t+4, the number of watermark blocks 312 decreases. Consequently, there is a decrease in the area of the watermark pattern superimposed on the images, and the watermark pattern disappears in an image 302 at the timing t+4. After the timing t+4 onward, the area of the watermark pattern increases and again becomes the largest in an image 303 at the timing t+8.

Figure 3:
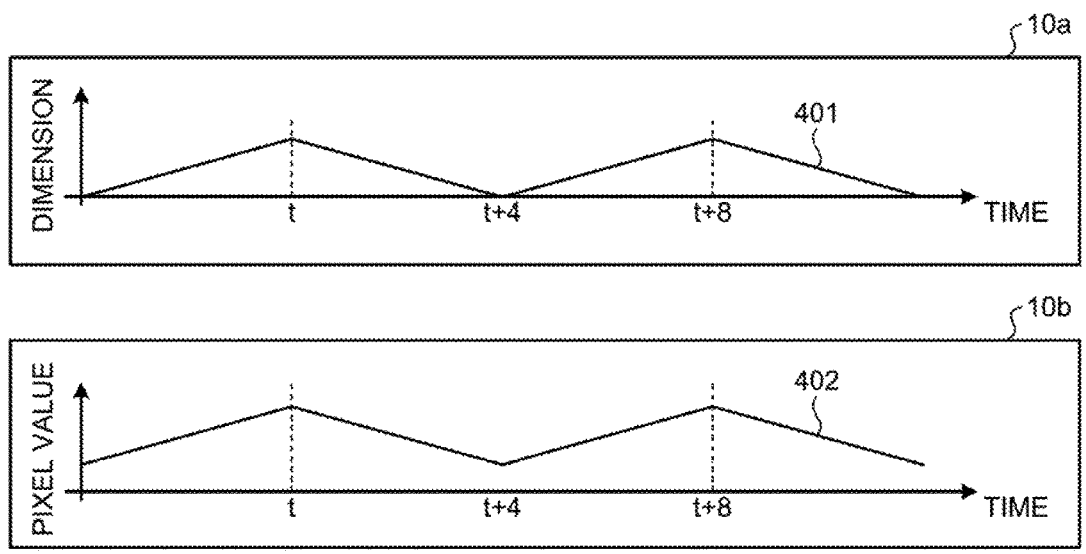
FIG. 3 is a diagram illustrating the correspondence relationship between the temporal variation in the dimension of a watermark pattern and the temporal variation in the average value of the pixel values in a reference area.

FIG. 3 is a diagram illustrating the correspondence relationship between the temporal variation in the dimension of the watermark pattern and the temporal variation in the average value of the pixel values in the reference area. Regarding the watermark pattern illustrated in FIG. 3, the temporal variation in the dimension is assumed to correspond to the watermark pattern illustrated in FIG. 2. In a graph 10a illustrated in FIG. 3, the horizontal axis represents the time and the vertical axis represents the dimension of the watermark pattern. A waveform 401 represents the dimension of the watermark pattern corresponding to the timings t to t+8.

In a graph 10b illustrated in FIG. 3, the horizontal axis represents the time and the vertical axis represents the pixel values. A waveform 402 represents the average pixel value in a reference area corresponding to the timings t to t+8. For example, the reference area corresponds to a predetermined area in the image.

In the examples illustrated in FIGS. 2 and 3, each pixel of the watermark pattern has a positive value. Hence, as illustrated in the waveform 402, the average pixel value in the reference area decreases in proportion as the area of the watermark pattern decreases and increases in proportion as the area of the watermark pattern increases.

Figure 4:
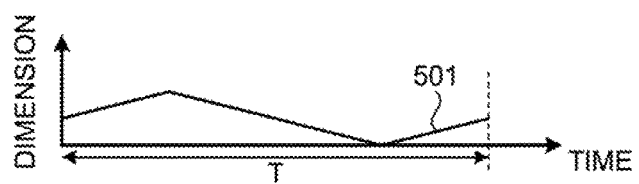
FIG. 4 is a diagram illustrating an exemplary relationship between the dimension and the temporal variation of a watermark pattern corresponding to the bits "1".

For example, the watermark information generating unit 140b associates the bits "1" or the bits "0" to the relationship between the dimension of the watermark pattern and the temporal variation. FIG. 4 is a diagram illustrating an exemplary relationship between the dimension and the temporal variation of the watermark pattern corresponding to the bits "1". FIG. 4 is a diagram illustrating an exemplary relationship between the dimension and the temporal variation of the watermark pattern corresponding to the bits "0".

Figure 5:
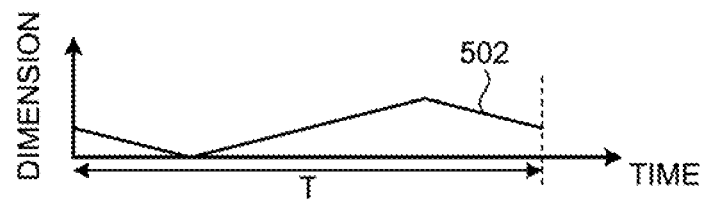
FIG. 5 is a diagram illustrating an exemplary relationship between the dimension and the temporal variation of a watermark pattern corresponding to the bits "0".

In FIGS. 4 and 5, the horizontal axis represents the dimension of the watermark pattern and the vertical axis represents the time. A waveform 501 illustrated in FIG. 4 indicates the relationship between the dimension and the temporal variation of the watermark pattern corresponding to the bits "1". A waveform 502 illustrated in FIG. 5 indicates the relationship between the dimension and the temporal variation of the watermark pattern corresponding to the bits "0". The waveforms 501 and 502 have identical amplitude and an identical period T, but have the phases shifted therebetween by T/2.

The watermark information generating unit 140b generates a watermark pattern in which the relationship between the dimension and the time corresponds to the relationship illustrated in the waveform 501 or the waveform 502 according to the bit sequence. For example, if the bit sequence is "111 . . . ", such watermark patterns are generated in succession in which the relationship between the dimension and the time represents the waveform 501. If the bit sequence is "1010 . . . ", watermark patterns in which the relationship between the dimension and the time represents the waveform 501 and watermark patterns in which the relationship between the dimension and the time represents the waveform 502 are generated alternately and in succession. Regarding other bit sequences too, the watermark information generating unit 140b generates watermark patterns corresponding to the waveform 501 or the waveform 502 in an identical manner.

The watermark information generating unit 140b according to the first embodiment generates two watermark patterns corresponding to two types of bit sequences. For example, the watermark pattern corresponding to the first bit sequence is referred to as a first watermark pattern, and the watermark pattern corresponding to the second bit sequence is referred to as a second watermark pattern. The watermark information generating unit 140b outputs the information of the first watermark pattern and the second watermark pattern to the watermark information embedding unit 140c.

The watermark information embedding unit 140c is a processing unit that embeds, in the visual information 130a, the watermark pattern corresponding to the digital watermark information, and thus generates the signal embedding visual information 131a and 131b. For example, the watermark information embedding unit 140c embeds the first watermark pattern in the visual information 130a and generates the signal embedding visual information 131a. Similarly, the watermark information embedding unit 140c embeds the second watermark pattern in the visual information 130a and generates the signal embedding visual information 131b.

Given below is the explanation of an example of the operations performed by the watermark information embedding unit 140c. For each image included in the visual information 130a, the watermark information embedding unit 140c compares the reference area of the concerned image with the first watermark pattern at each timing, and corrects the values of such pixels in the reference area which overlap with the watermark blocks of the first watermark pattern with the values of the pixels included in the watermark block. For example, when the pixels included in a watermark block have the value "2", the watermark information embedding unit 140c adds "2" to the value of the pixels included in the area that overlaps with the watermark block.

As a result of performing the abovementioned operation with respect to the reference area of each image included in the visual information 130a, the watermark information embedding unit 140c generates the signal embedding visual information 131a. Regarding the second watermark pattern too, the watermark information embedding unit 140c performs operations identical to those performed regarding the first watermark pattern and generates the signal embedding visual information 131b.

Regarding the signal embedding visual information 131a, the watermark information embedding unit 140c attaches the information about the timing of appearance of the initial image in which the first watermark pattern is embedded. Regarding the signal embedding visual information 131b, the watermark information embedding unit 140c attaches the information about the timing of appearance of the initial image in which the second watermark pattern is embedded.

The projection control unit 141a is a processing unit that projects the video corresponding to the signal embedding visual information 131a onto the lighting device 120a. The projection control unit 141b is a processing unit that projects the video corresponding to the signal embedding visual information 131b onto the lighting device 120b.

At the time of projecting the videos corresponding to the sets of signal embedding visual information 131a and 131b onto the lighting devices 120a and 120b, respectively; the projection control units 141a and 141b synchronize the phases of the digital watermark information. For example, regarding the signal embedding visual information 131a and 131b, with reference to the timings of appearance of the initial image in which the first watermark information and the second watermark information are embedded, the projection control units 141a and 141b start projecting the images and synchronize the phases of the digital watermark information.

Figure 6:
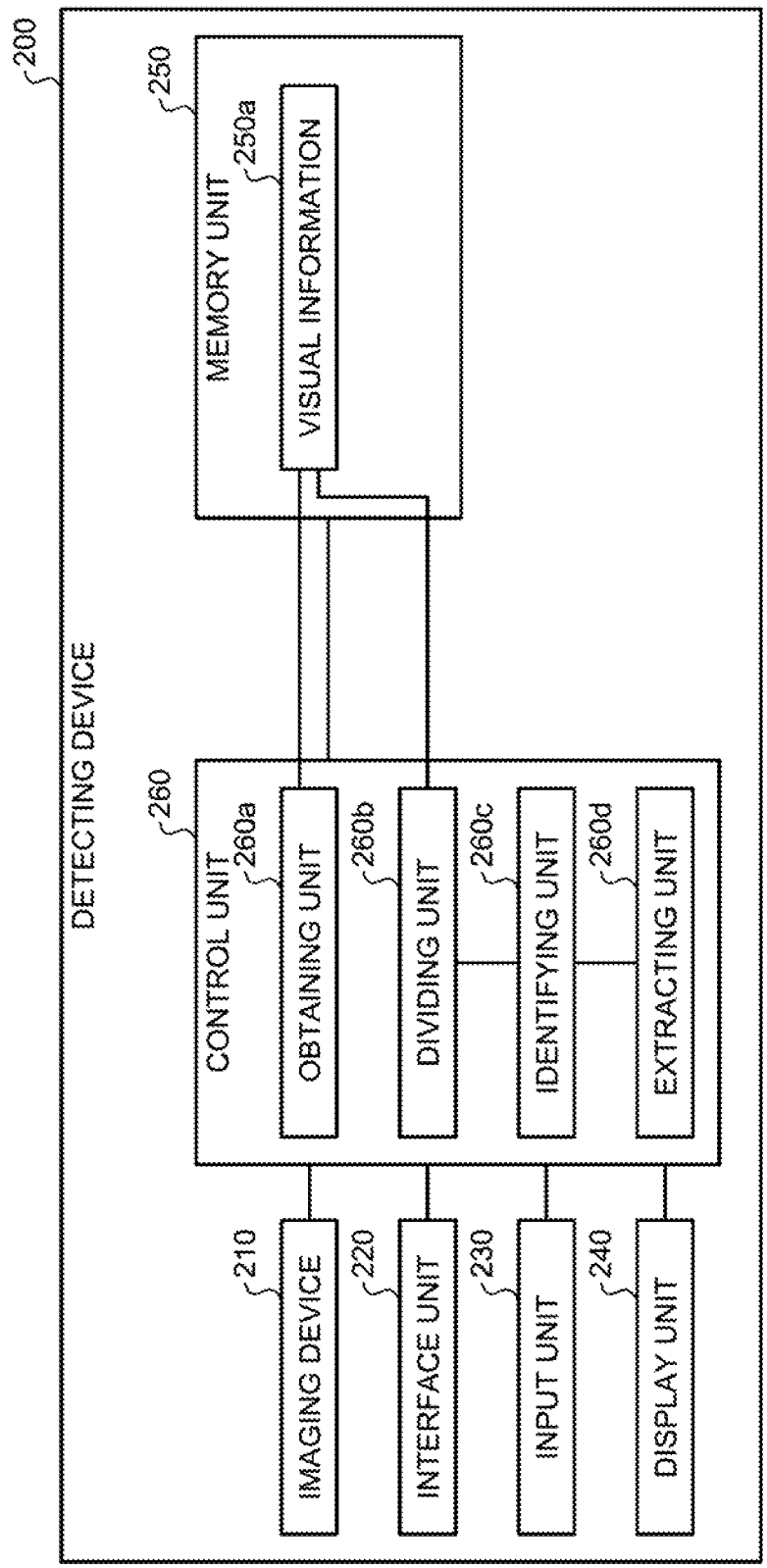
FIG. 6 is a functional block diagram of a detecting device according to the first embodiment.

Given below is the explanation of a detecting device according to the first embodiment. Herein, a detecting device represents an example of a digital watermark information detecting device. FIG. 6 is a functional block diagram of the detecting device according to the first embodiment. As illustrated in FIG. 6, a detecting device 200 includes an imaging device 210, an interface unit 220, an input unit 230, a display unit 240, a memory unit 250, and a control unit 260.

The imaging device 210 is a device that captures the videos projected by the lighting devices 120a and 120b of the embedding device 100 illustrated in FIG. 1. For example, the imaging device 210 corresponds to a video camera. The imaging device 210 outputs the visual information of the captured videos to the control unit 260.

The interface unit 220 is a device that performs data communication with other devices via a communication network or a communication cable. Moreover, the interface unit 220 can perform data communication with other imaging devices via a communication network, and obtain information of the videos captured by the imaging device 210.

The input unit 230 is an input device for inputting a variety of information to the detecting device 200. For example, the input unit 230 corresponds to a keyboard, a mouse, or a touch-sensitive panel.

The display unit 240 is a device that displays the information output from the control unit 260. The display unit 240 corresponds to a liquid crystal display or a touch-sensitive panel.

The memory unit 250 is used to store visual information 250a. For example, the memory unit 250 corresponds to a semiconductor memory element such as a RAM, a ROM, or a flash memory; or corresponds to a memory device such as an HDD.

The visual information 250a represents information of the videos projected by the lighting devices 120a and 120b of the embedding device 100 illustrated in FIG. 1. For example, the visual information 250a is obtained from the imaging device 210.

The control unit 260 includes an obtaining unit 260a, a dividing unit 260b, an identifying unit 260c, and an extracting unit 260d. For example, the control unit 260 corresponds to an integrated device such as an ASIC or an FPGA. Alternatively, for example, the control unit 260 corresponds to an electronic circuit such as a CPU or an MPU.

The obtaining unit 260a is a processing unit that obtains visual information from the imaging device 210 and stores the obtained visual information as the visual information 250a in the memory unit 250. Moreover, the obtaining unit 260a can obtain visual information from other imaging devices via a communication network and store the obtained visual information in the memory unit 250.

The dividing unit 260b is a processing unit that divides each set of image data, which is included in the visual information 250a, into a plurality of areas. Then, the dividing unit 260b outputs the divided sets of image data to the identifying unit 260c. For example, the dividing unit 260b outputs the divided sets of image data in chronological order to the identifying unit 260c.

Figure 7:
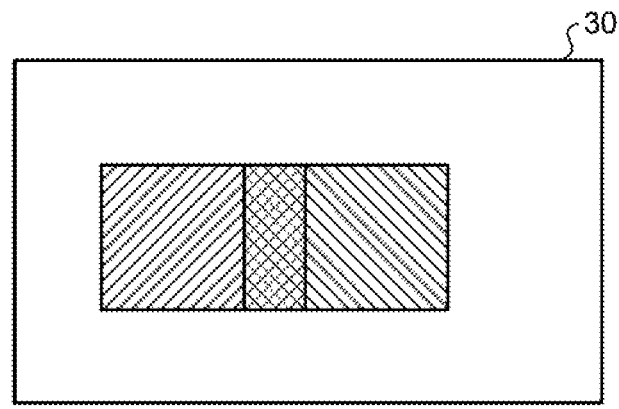
FIG. 7 is a diagram illustrating an example of particular image data included in visual information.
Figure 8:
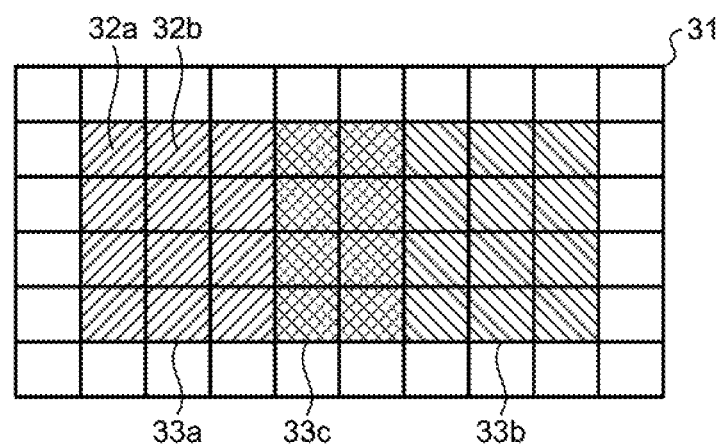
FIG. 8 is a diagram (1) illustrating an example of image data that has been divided into a plurality of small areas.

FIG. 7 is a diagram illustrating an example of particular image data included in visual information. The dividing unit 260b divides image data 30 illustrated in FIG. 7 into a plurality of small areas. FIG. 8 is a diagram (1) illustrating an example of image data that has been divided into a plurality of small areas. Regarding all sets of image data included in the visual information 250a, the dividing unit 260b divides the image data 31 into a plurality of small areas as illustrated in FIG. 8. Then, the dividing unit 260b outputs the image data that has been divided into a plurality of small areas to the identifying unit 260c.

The identifying unit 260c is a processing unit that extracts the amplitude of the digital watermark information based on the small areas of each set of image data, and identifies such successive areas in which the amplitude of the digital watermark information is constant as the target areas for extraction. Then, the identifying unit 260c outputs the sets of image data included in the visual information 250a along with the information on the target areas for extraction to the extracting unit 260d.

Given below is the specific explanation of the identifying unit 260c. In the first embodiment, for the purpose of illustration, the area projected by the lighting device 120a is defined as a first area. Moreover, the area projected by the lighting device 120*b* is defined as a second area. Furthermore, the overlapping area between the area projected by the lighting device 120*a* and the area projected by the lighting device 120*b* is defined as a third area.

The embedding device 100 projects visual information that has different sets of digital watermark information, in each of which the frequency and the amplitude are constant and the phase is reversed depending on whether "bit 1" or "bit 0" is indicated, embedded therein in a synchronized manner. For that reason, the amplitude of the third area becomes equal to twice or zero times of the amplitude of the first area or the second area.

Figure 9:
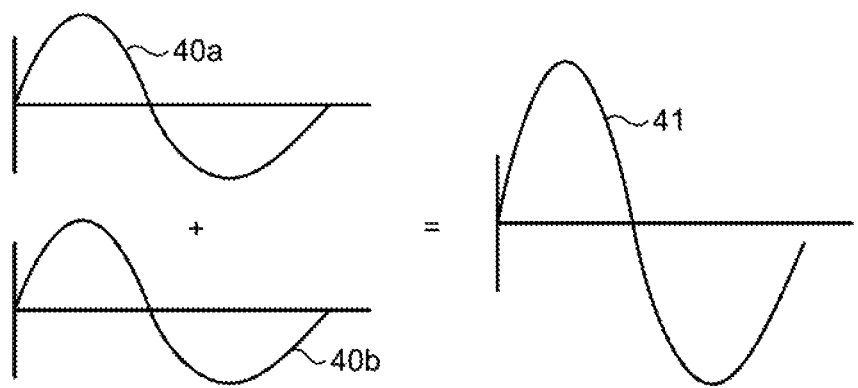
FIG. 9 is a diagram (1) for explaining the amplitude of a third area.
Figure 10:
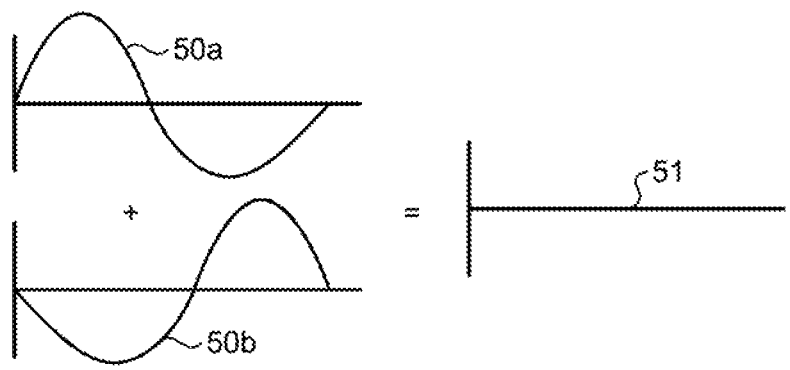
FIG. 10 is a diagram (2) for explaining the amplitude of the third area.

FIGS. 9 and 10 are diagrams for explaining the amplitude of the third area according to the first embodiment. The waveforms illustrated in FIGS. 9 and 10 are not limited to those illustrated in FIGS. 9 and 10 and can alternatively be, for example, triangular waveforms as illustrated in FIGS. 4 and 5. In FIG. 9, the horizontal axis of each graph represents the time and the vertical axis of each graph represents the amplitude size. In FIG. 9, a signal 40*a* represents the signal in the case in which the digital watermark information included in the first area indicates "bit 1". Moreover, a signal 40*b* represents the signal in the case in which the digital watermark information included in the second area indicates "bit 1". Furthermore, a signal 41 represents the signal of the third area in the case in which the digital watermark information included in the first area as well as the second area indicates "bit 1". As illustrated in FIG. 9, when the digital watermark information included in the first area as well as the second area indicates "bit 1", the amplitude of the signal 41 included therein becomes equal to twice that of the signal 40*a* of the first area and the signal 40*b* of the second area.

In FIG. 10, the horizontal axis of each graph represents the time and the vertical axis of each graph represents the amplitude size. In FIG. 10, a signal 50*a* represents the signal in the case in which the digital watermark information included in the first area indicates "bit 0". Moreover, a signal 50*b* represents the signal in the case in which the digital watermark information included in the second area indicates "bit 1". Furthermore, a signal 51 represents the signal of the third area in the case in which the digital watermark information included in the first area indicates "bit 1" and the digital watermark information included in the second area indicates "bit 0". As illustrated in FIG. 10, when the digital watermark information included in the first area is different than the digital watermark information included in the second area, the amplitude of the signal 51 included in the third area becomes equal to "0".

In the example illustrated in FIG. 10, a case is illustrated in which the digital watermark information of the first area indicates "bit 0" and the digital watermark information of the second area indicates "bit 1". In an identical manner, also in the case in which the digital watermark information of the first area indicates "bit 1" and the digital watermark information of the second area indicates "bit 0", the amplitude of the signal included in the third area becomes equal to "0".

As illustrated in FIGS. 9 and 10, the identifying unit 260*c* extracts the amplitude from the small areas of each set of image data in chronological order, and can distinguish the first area or the second area from the third area by focusing on the variation in the amplitude accompanying the temporal variation. For example, the identifying unit 260*c* refers to the small areas of the image data and identifies the distribution of amplitudes, and identifies the area in which the amplitude size is twice that of the other amplitudes as the third area and identifies the other areas as the target areas for extraction. Moreover, the identifying unit 260*c* compares the temporal variation of the neighboring small areas and compares the amplitude variation of the neighboring small areas and, when the temporal variation is identical and the amplitude variation is identical, repeatedly performs an operation for integrating the neighboring small areas.

For example, with reference to FIG. 8, assume that each of small areas 33*a* and 33*b* has the amplitude of "1" and a small area 33*c* has the amplitude of "2". In that case, the amplitude size of the area 33*c* becomes twice that of the other amplitudes. For that reason, the identifying unit 260*c* identifies the area 33*c* as the third area, and identifies the areas 33*a* and 33*b* as the first areas or the second areas. Herein, the areas 33*a* and 33*b* serve as the target areas for extraction.

The identifying unit 260*c* compares a small area 32*a* with a small area 32*b* and, if the amplitude accompanying the temporal variation is identical, integrates the small area 32*a* with the small area 32*b*. The identifying unit 260*c* performs identical operations with respect each pair of neighboring small areas, and identifies the areas 33*a* and 33*b* as the target areas for extraction.

Given below is the explanation of an example of the operations performed by the identifying unit 260*c* to extract the amplitudes from small areas. The identifying unit 260*c* calculates the average pixel values in the small areas. Then, the identifying unit 260*c* creates a one-dimensional vector in which the average pixel values in the small areas are arranged in chronological order. For example, the explanation is given with reference to FIG. 8. The identifying unit 260*c* arranges the following average pixel values in chronological order: the average pixel value of the small area 32*a* of the n-th set of image data; the average pixel value of the small area 32*a* of the n+1-th set of image data; the average pixel value of the small area 32*a* of the n+2-th set of image data; . . . ; and the average pixel value of the small area 32*a* of the m-th set of image data. Herein, m is an integer equal to or greater than three.

Then, the identifying unit 260*c* performs frequency conversion of the one-dimensional vector of the average pixel values, and calculates the spectral density of each frequency. Herein, it is assumed that the identifying unit 260*c* is notified in advance about the frequency of the digital watermark information. From among the spectral densities of the frequencies obtained as a result of frequency conversion of the one-dimensional vector, the identifying unit 260*c* performs inverse frequency conversion with respect to the frequency corresponding to the frequency of the digital watermark information and identifies the relationship between the time and the amplitude of the digital watermark information. For example, by implementing the technology disclosed in Patent Literature (Japanese Laid-open Patent Publication No. 2012-142741), the identifying unit 260*c* can extract the amplitudes from small areas.

Returning to the explanation with reference to FIG. 6, the extracting unit 260*d* is a processing unit that extracts digital watermarking information from the target areas for extraction in each set of image data included in the visual information 250*a*. Then, the extracting unit 260*d* can display the extracted digital watermark information on the display unit 240 or can notify an external device about the digital watermark information via the interface unit 220.

The extracting unit 260*d* performs identical operations to those performed by the identifying unit 260*c* and identifies the relationship between the time and the amplitude of the digital watermark information from the target areas for extraction in each set of image data. The identifying unit 260c compares the waveform corresponding to the bits 1 and the waveform corresponding to the bits 0 of the digital watermark information with the waveform of the time and the amplitude of the digital watermark information, and extracts a bit sequence from the digital watermark information. Herein, it is assumed that the extracting unit 260d holds in advance the information about the waveform corresponding to the bits 1 and the waveform corresponding to the bits 0 of the digital watermark information.

Figure 11:
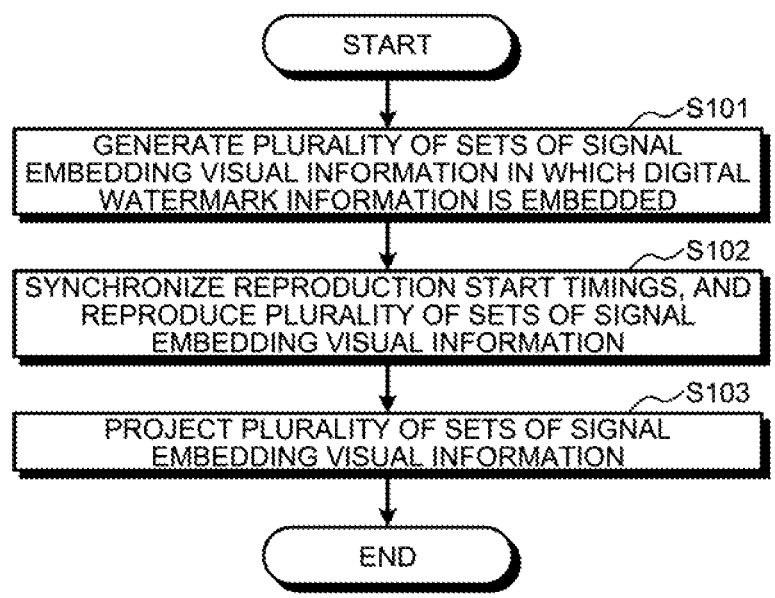
FIG. 11 is a flowchart for explaining a sequence of operations performed in the embedding device according to the first embodiment.

Given below is the explanation of a sequence of operations performed in the embedding device 100 according to the first embodiment. FIG. 11 is a flowchart for explaining a sequence of operations performed in the embedding device according to the first embodiment. As illustrated in FIG. 11, the watermark information embedding unit 140c of the embedding device 100 generates a plurality of sets of signal embedding visual information in which digital watermark information is embedded (Step S101).

The projection control units 141a and 141b of the embedding device 100 synchronize reproduction start timings and reproduce a plurality of sets of signal embedding visual information (Step S102). Then, the lighting devices 120a and 120b of the embedding device 100 project the sets of signal embedding visual information (Step S103).

Figure 12:
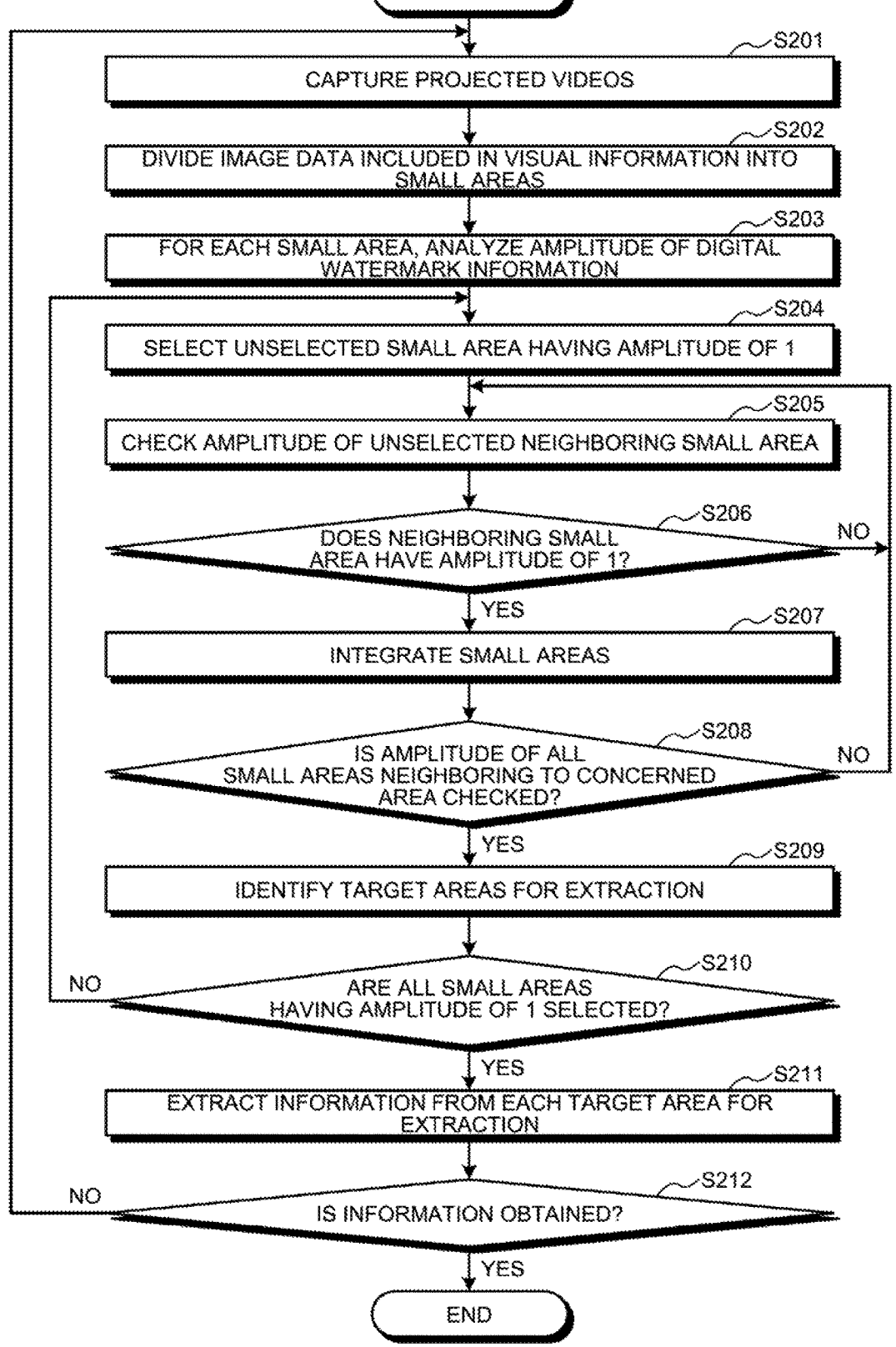
FIG. 12 is a flowchart for explaining a sequence of operations performed in the detecting device according to the first embodiment.

Given below is the explanation of a sequence of operations performed in the detecting device 200 according to the first embodiment. FIG. 12 is a flowchart for explaining a sequence of operations performed in the detecting device according to the first embodiment. In the flowchart illustrated in FIG. 12, as an example, the digital watermark information is assumed to have the amplitude of 1.

As illustrated in FIG. 12, the imaging device 210 of the detecting device 200 captures the videos projected onto the embedding device 100 (Step S201). Then, the dividing unit 260b of the detecting device 200 divides the image data included in the visual information 250a into small areas (Step S202).

The identifying unit 260c of the detecting device 200 analyzes the amplitude of the digital watermark information for each small area (Step S203). Then, the identifying unit 260c selects an unselected small area having the amplitude of 1 (Step S204) and checks the amplitude of the unselected neighboring small area (Step S205).

The identifying unit 260c determines whether or not the neighboring small area has the amplitude of 1 (Step S206). If the neighboring small area does not have the amplitude of 1 (No at Step S206), then the system control returns to Step S205.

On the other hand, when the neighboring small area has the amplitude of 1 (Yes at Step S206), the identifying unit 260c integrates the small areas (Step S207). Then, the identifying unit 260c determines whether or not the amplitude of all small areas neighboring to the concerned area is checked (Step S208). If the amplitude of all small areas neighboring to the concerned area is not yet checked (No at Step S208), then the system control returns to Step S205.

On the other hand, when the amplitude of all small areas neighboring to the concerned area is checked (Yes at Step S208), the identifying unit 260c identifies the target areas for extraction (Step S209). Then, the identifying unit 260c determines whether or not all small areas having the amplitude of 1 have been selected (Step S210). If all small areas having the amplitude of 1 have not been selected (No at Step S210), then the system control returns to Step S204.

On the other hand, when all small areas having the amplitude of 1 are selected (Yes at Step S210), the extracting unit 260d of the detecting device 200 extracts information from the target areas for extraction (Step S211) and determines whether or not the information is obtained (Step S212).

If the information is obtained (Yes at Step S212), then the extracting unit 260d ends the operations. On the other hand, if the information is not obtained (No at Step S212), then the system control returns to Step S201.

Given below is the explanation about the effect of the detecting device 200 according to the first embodiment. The detecting device 200 divides the area of a projected image in which a plurality of sets of digital watermark information is embedded in a synchronized manner, and extracts the amplitude of the digital watermark information of each divided area. Then, the detecting device 200 treats such consecutive areas which have constant amplitude of watermark signals as the target areas for extraction and extracts information. For that reason, when different sets of digital watermark information interfere with each other, the detecting device 200 can identify such areas in which only particular embedding information is overlapping, and can obtain the information.

Moreover, the detecting device 200 extracts, at different timings, the amplitude of the digital watermark information included in the small areas; and determines the identity of the time direction of amplitudes so as to identify the target area for extraction. That enables the detecting device 200 to accurately identify the area in which different sets of digital watermark information do not overlap.

Furthermore, the detecting device 200 extracts, at different timings, the amplitude of the digital watermark information included in the small areas; integrates the areas having the same amplitude over time, and identifies the integrated areas as the target area for extraction. Hence, the detecting device 200 can maximize the area in which the digital watermark information is to be detected. As a result, even if there is only a small variation in the digital watermark information, the detecting device 200 can extract the digital watermark information with accuracy.

[b] Second Embodiment

In a second embodiment, an embedding device generates three types of visual information in which three types of digital watermark information is embedded, and projects a video corresponding to each type of visual information onto a predetermined area. Then, the detecting device captures the projected videos and, based on the visual information of the captured videos, detects the information embedded in the visual information. Herein, the detecting device represents an example of a digital watermark information detecting device.

Figure 13:
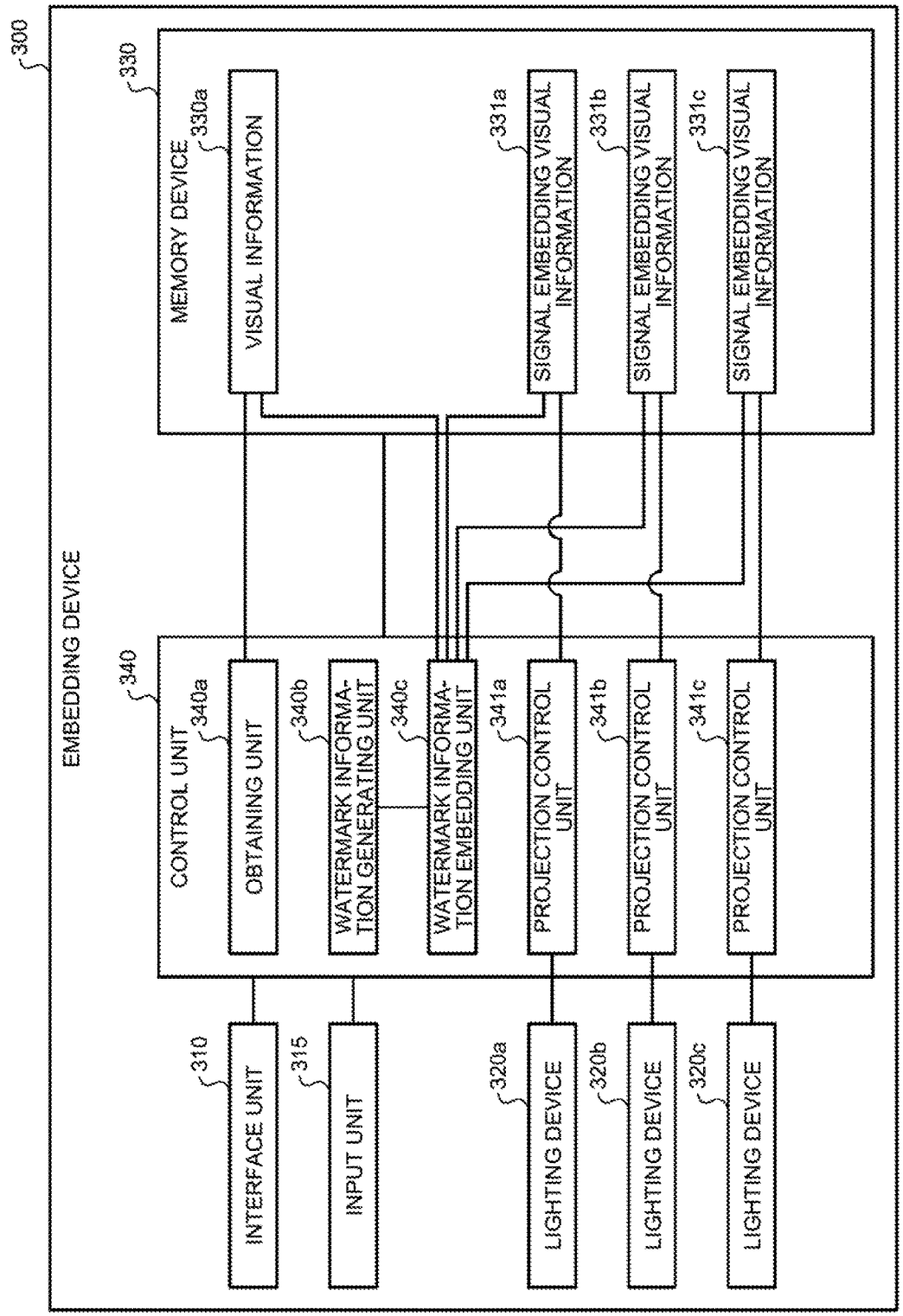
FIG. 13 is a functional block diagram illustrating a configuration of an embedding device according to a second embodiment.

Given below is the explanation of a configuration of the embedding device according to the second embodiment. FIG. 13 is a functional block diagram illustrating a configuration of the embedding device according to the second embodiment. As illustrated in FIG. 13, an embedding device 300 includes an interface unit 310; an input unit 315; lighting devices 320a, 320b, and 320c; a memory unit 330; and a control unit 340.

Herein, the explanation about the interface unit 310; the input unit 315; and the lighting devices 320a, 320b, and 320c is identical to the explanation about the interface unit 110, the input unit 115, and the lighting device 120, respectively, illustrated in FIG. 1. In the following explanation, the lighting devices 320a, 320b, and 320c are collectively referred to as lighting devices 320.

The memory unit 330 is used to store visual information 330a and signal embedding visual information 331a, 331b, and 331c. For example, the memory unit 330 corresponds to a semiconductor memory element such as a RAM, a ROM, or a flash memory; or corresponds to a memory device such as an HDD.

The visual information 330a represents information of digital contents expressed in the form of moving images. The explanation about the visual information 330a is identical to the explanation about the visual information 130a illustrated in FIG. 1.

The signal embedding visual information 331a, 331b, and 331c corresponds to the information formed by embedding digital watermark information in the visual information 330a. In the second embodiment, it is assumed that the digital watermark information embedded in the signal embedding visual information 331a, the digital watermark information embedded in the signal embedding visual information 331b, and the digital watermark information embedded in the signal embedding visual information 331c is mutually different information.

The control unit 340 includes an obtaining unit 340a; a watermark information generating unit 340b; a watermark information embedding unit 340c; and projection control units 341a, 341b, and 341c. For example, the control unit 340 corresponds to an integrated device such as an ASIC or an FPGA. Alternatively, for example, the control unit 340 corresponds to an electronic circuit such as a CPU or an MPU.

The obtaining unit 340a is a processing unit that obtains visual information from a video input device via the interface unit 310, and stores the obtained visual information as the visual information 330a in the memory unit 330. Meanwhile, the obtaining unit 340a can obtain visual information also from an external device via a communication network, and store the obtained visual information in the memory unit 330.

The watermark information generating unit 340b is a processing unit that generates a watermark pattern corresponding to digital watermark information. The operations performed by the watermark information generating unit 340b to generate a watermark pattern are identical to the operations performed by the watermark information generating unit 140b.

The watermark information generating unit 340b generates watermark patterns corresponding to three types of bit sequences. For example, the watermark pattern corresponding to the first bit sequence is referred to as a first watermark pattern, the watermark pattern corresponding to the second bit sequence is referred to as a second watermark pattern, and the watermark pattern corresponding to the third bit sequence is referred to as a third watermark pattern. The watermark information generating unit 340b outputs the information of the first watermark pattern, the second watermark pattern, and the second watermark pattern to the watermark information embedding unit 340c.

The watermark information embedding unit 340c is a processing unit that embeds the watermark pattern corresponding to digital watermark information in the visual information 330a, and generates the signal embedding visual information 331a, 331b, and 331c. For example, the watermark information embedding unit 340c embeds the first pattern in the visual information 330a and generates the signal embedding visual information 331a. Moreover, the watermark information embedding unit 340c embeds the second pattern in the visual information 330a and generates the signal embedding visual information 331b. Furthermore, the watermark information embedding unit 340c embeds the third pattern in the visual information 330a and generates the signal embedding visual information 331c. Herein, the operations performed by the watermark information embedding unit 340c to embed each watermark pattern in the visual information 330a are identical to the operations performed by the watermark information embedding unit 140c illustrated in FIG. 1.

Regarding the signal embedding visual information 331a, the watermark information embedding unit 340c attaches the information about the timing of appearance of the initial image in which the first watermark pattern is embedded. Moreover, regarding the signal embedding visual information 331b, the watermark information embedding unit 340c attaches the information about the timing of appearance of the initial image in which the second watermark pattern is embedded. Furthermore, regarding the signal embedding visual information 331c, the watermark information embedding unit 340c attaches the information about the timing of appearance of the initial image in which the third watermark pattern is embedded.

The projection control unit 341a is a processing unit that projects the video corresponding to the signal embedding visual information 331a onto the lighting device 320a. The projection control unit 341b is a processing unit that projects the video corresponding to the signal embedding visual information 331b onto the lighting device 320b. The projection control unit 341c is a processing unit that projects the video corresponding to the signal embedding visual information 331c onto the lighting device 320c.

At the time of projecting the videos corresponding to the sets of signal embedding visual information 331a, 331b, and 331c onto the lighting devices 320a, 320b, and 320c, respectively; the projection control units 341a, 341b, and 341c synchronize the phases of the digital watermark information. For example, regarding the signal embedding visual information 331a to 331c, with reference to the timings of appearance of the initial images in which the first watermark information to the third watermark information is embedded, the projection control units 341a to 341c start projecting the images and synchronize the phases of the digital watermark information.

Figure 14:
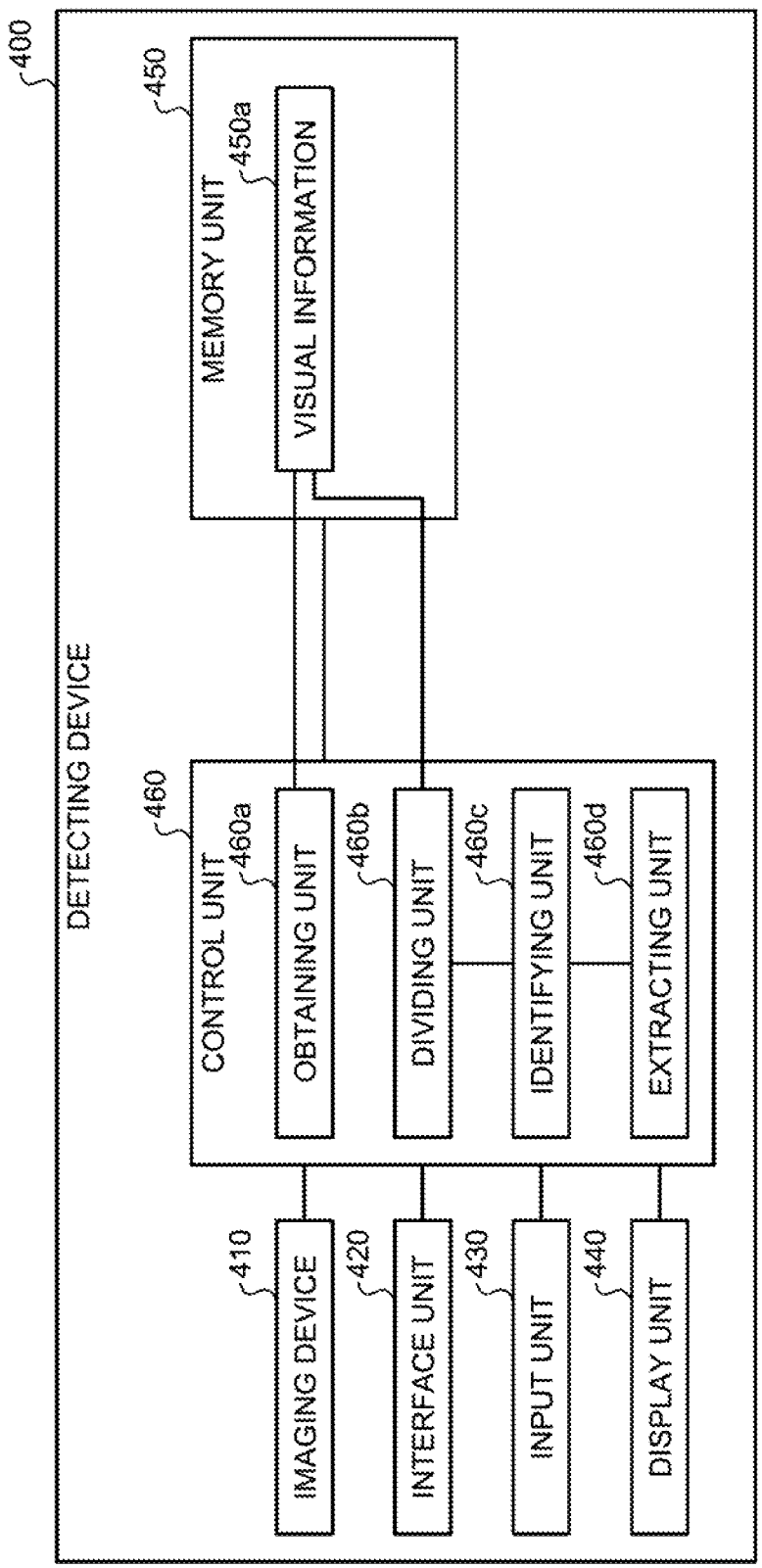
FIG. 14 is a functional block diagram illustrating a configuration of a detecting device according to the second embodiment.

Given below is the explanation of a configuration of a detecting device according to the second embodiment. The detecting device represents an example of a digital watermark information device. FIG. 14 is a functional block diagram illustrating a configuration of the detecting device according to the second embodiment. As illustrated in FIG. 14, a detecting device 400 includes an imaging device 410, an interface unit 420, an input unit 430, a display unit 440, a memory unit 450, and a control unit 460.

The imaging device 410 is a device that captures the videos projected by the lighting devices 320a to 320c of the embedding device 300 illustrated in FIG. 13. For example, the imaging device 410 corresponds to a video camera. The imaging device 410 outputs the visual information of the captured videos to the control unit 460.

The explanation about the interface unit 420, the input unit 430, and the display unit 440 is identical to the explanation about the interface unit 220, the input unit 230, and the display unit 240, respectively, illustrated in FIG. 6.

The memory unit 450 is used to store visual information 450a. For example, the memory unit 450 corresponds to a semiconductor memory element such as a RAM, a ROM, or a flash memory; or corresponds to a memory device such as an HDD.

The visual information 450a represents information of the videos projected by the lighting devices 320a to 320c illustrated in FIG. 13. For example, the visual information 450a is obtained from the imaging device 410.

The control unit 460 includes an obtaining unit 460a, a dividing unit 460b, an identifying unit 460c, and an extracting unit 460d. For example, the control unit 460 corresponds to an integrated device such as an ASIC or an FPGA. Alternatively, for example, the control unit 460 corresponds to an electronic circuit such as a CPU or an MPU.

The obtaining unit 460a is a processing unit that obtains visual information from the imaging device 410 and stores the obtained visual information as the visual information 450a in the memory unit 450. Moreover, the obtaining unit 460a can also obtain visual information from other imaging devices via a communication network and store the obtained visual information in the memory unit 450.

The dividing unit 460b is a processing unit that divides each set of image data, which is included in the visual information 450a, into a plurality of areas. Then, the dividing unit 460b outputs the divided sets of image data to the identifying unit 460c. For example, the dividing unit 460b outputs the divided sets of image data in chronological order to the identifying unit 460c.

Figure 15:
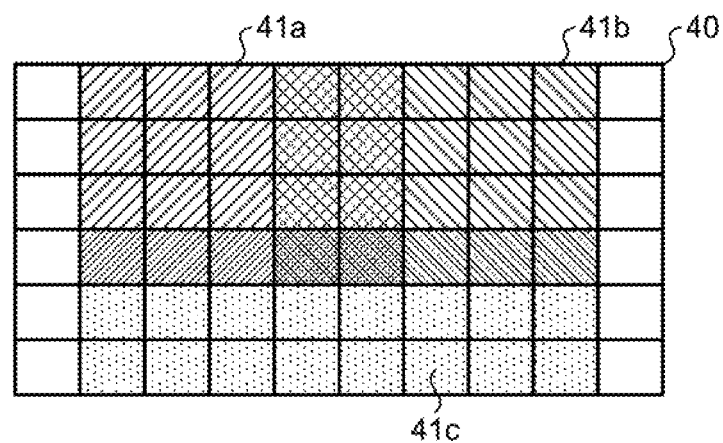
FIG. 15 is a diagram (2) illustrating an example of image data that has been divided into a plurality of small areas.

FIG. 15 is a diagram (2) illustrating an example of image data that has been divided into a plurality of small areas. Regarding all sets of image data included in the visual information 450a, the dividing unit 460b divides the image data into a plurality of small areas as illustrated in FIG. 15. Then, the dividing unit 460b outputs the image data that has been divided into a plurality of small areas to the identifying unit 460c.

The identifying unit 460c is a processing unit that extracts the amplitude of the digital watermark information based on the small areas of each set of image data, and identifies successive areas having a constant amplitude of the digital watermark information as the target areas for extraction. Then, the identifying unit 460c outputs the sets of image data included in the visual information 450a along with the information on the target areas for extraction to the extracting unit 460d. Herein, the operations performed by the identifying unit 460c to extract the amplitude from small areas are identical to the operations performed by the identifying unit 260c according to the first embodiment.

Given below is the specific explanation of the identifying unit 460c. In the second embodiment, for the purpose of illustration, the area projected by the lighting device 320a is defined as a first area. Moreover, the area projected by the lighting device 320b is defined as a second area. Furthermore, the area projected by the lighting device 320c is defined as a third area. Moreover, from among the lighting devices 320a to 320c, the area in which the areas projected by two lighting devices are overlapping is defined as a fourth area. Furthermore, the overlapping area among the areas projected by the lighting devices 320a, 320b, and 320c is defined as a fifth area.

The embedding device 300 projects visual information that has different sets of digital watermark information, in each of which the frequency and the amplitude are constant and the phase is reversed depending on whether "bit 1" or "bit 0" is indicated, embedded therein in a synchronized manner. For that reason, as illustrated in FIGS. 9 and 10, the amplitude of the fourth area becomes equal to twice or zero times of the amplitude of the first to third areas. However, the amplitude of the fifth area becomes triple the amplitude of or equal to the amplitude of the first to third areas. For that reason, in the method according to the first embodiment, there may be times when the first to third areas cannot be distinguished from the fifth area.

Figure 16:
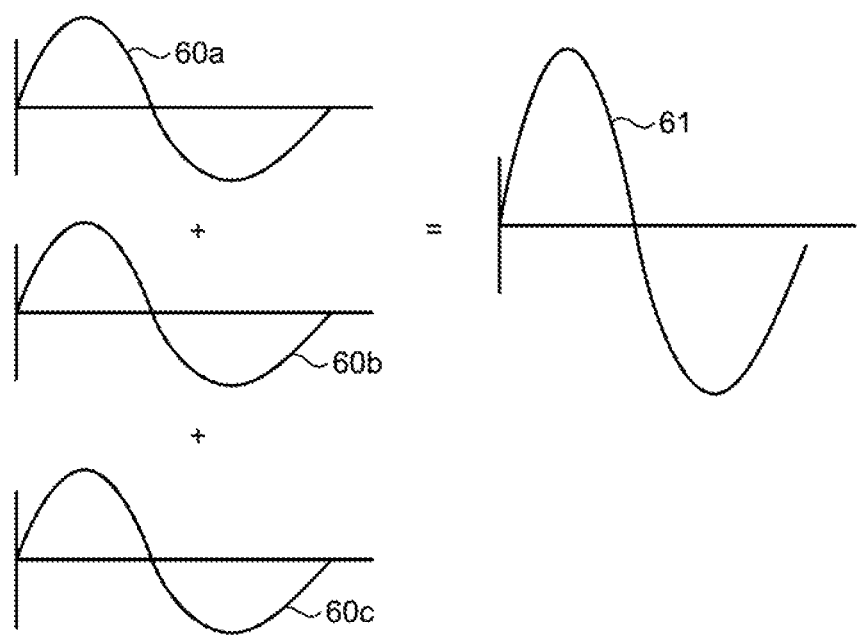
FIG. 16 is a diagram (1) for explaining the amplitude of a fifth area according to the second embodiment.
Figure 17:
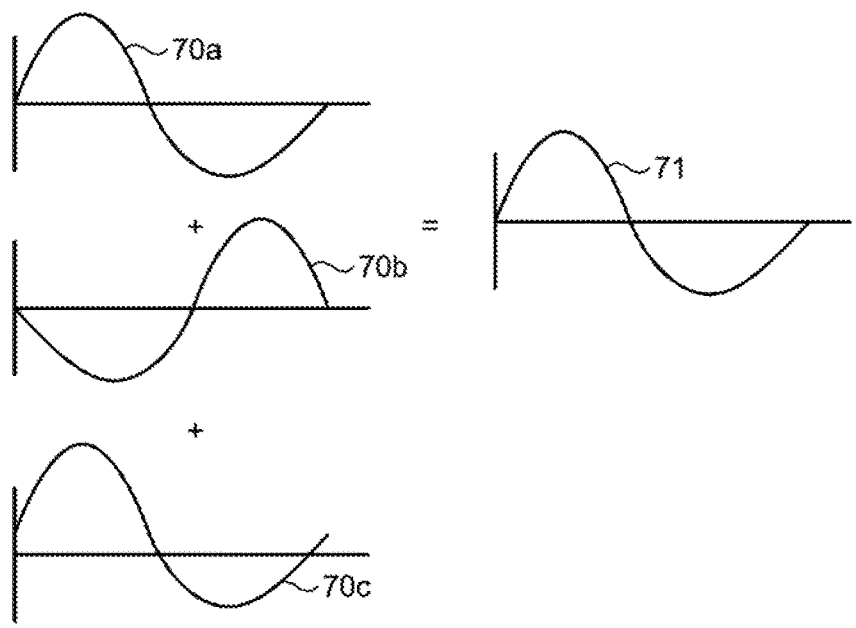
FIG. 17 is a diagram (2) for explaining the amplitude of the fifth area according to the second embodiment.

FIGS. 16 and 17 are diagrams for explaining the amplitude of the fifth area according to the second embodiment. The waveforms illustrated in FIGS. 16 and 17 are not limited to those illustrated in FIGS. 16 and 17 and can alternatively be, for example, triangular waveforms as illustrated in FIGS. 4 and 5. In FIG. 16, the horizontal axis of each graph represents the time and the vertical axis of each graph represents the amplitude size. For example, in FIG. 16, a signal 60a represents the signal in the case in which the digital watermark information included in the first area indicates "bit 1". Moreover, a signal 60b represents the signal in the case in which the digital watermark information included in the second area indicates "bit 1". Furthermore, a signal 60c represents the signal in the case in which the digital watermark information included in the third area indicates "bit 1". Moreover, a signal 61 represents the signal of the fourth area in the case in which the digital watermark information included in the first to third areas indicates "bit 1". As illustrated in FIG. 16, when the digital watermark information included in the first to third areas indicates "bit 1", the amplitude of the signal 61 included therein becomes equal to thrice the amplitude of the signals 60a, 60b, and 60c of the first to third areas, respectively.

In FIG. 17, the horizontal axis of each graph represents the time and the vertical axis of each graph represents the amplitude size. In FIG. 17, a signal 70a represents the signal in the case in which the digital watermark information included in the first area indicates "bit 1". Moreover, a signal 70b represents the signal in the case in which the digital watermark information included in the second area indicates "bit 0". Furthermore, a signal 70c represents the signal in the case in which the digital watermark information included in the third area indicates "bit 1". As illustrated in FIG. 17, when the digital watermark information included in the first to third areas indicates "bit 1", "bit 0", and "bit 1", respectively; the amplitude of a signal 71 included in the fifth area becomes equal to the amplitude of the signals 70a, 70b, and 70c included in the first to third areas, respectively.

The identifying unit 460c extracts the amplitude from the small areas of each set of image data in chronological order, and distinguishes the first to third areas from the areas other than the first to third areas by focusing on the area surrounded by the reference axis and the amplitude in a predetermined period.

Figure 18:
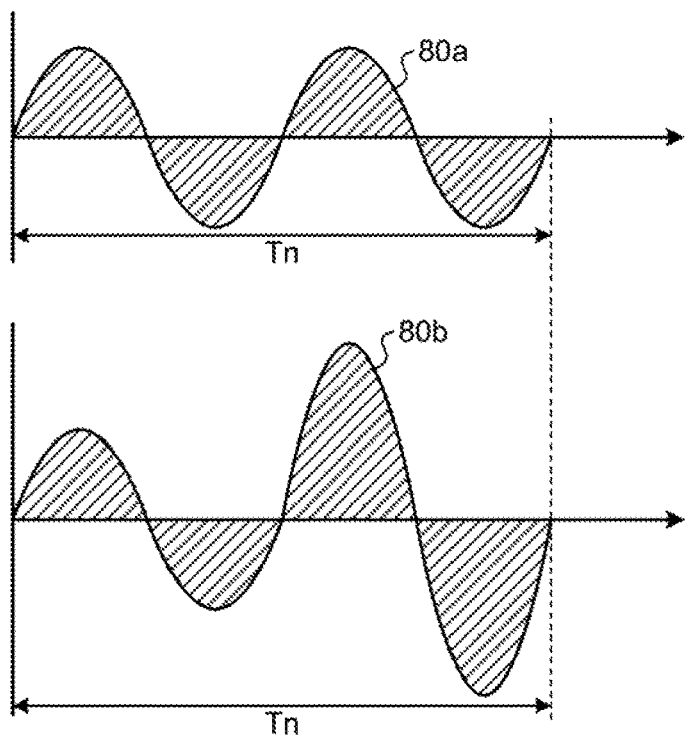
FIG. 18 is a diagram (1) for explaining the operations performed by an identifying unit according to the second embodiment.

FIG. 18 is a diagram for explaining the operations performed by the identifying unit according to the second embodiment. In FIG. 18, the horizontal axis of each graph represents the time and the vertical axis of each graph represents the amplitude size. If the small areas of interest are areas corresponding to the first to third areas; then, for example, as illustrated by a signal 80a in FIG. 18, the amplitude takes a constant value. In contrast, if the small areas of interest are not areas corresponding to the first to third areas; then, for example, as illustrated by a signal 80b in FIG. 18, the amplitude does not take a constant value. For example, if the small areas are areas corresponding to the fifth area, the amplitude that is equal to thrice the amplitude of the areas corresponding to the first to third areas appears on an irregular basis.

In the section of a predetermined period $T_n$, the identifying unit 460c calculates an integral value obtained by integrating the absolute values of amplitudes of the signals of the digital watermark information. In the following explanation, the integral value is written as the waveform dimension. If the small areas of interest are areas corresponding to the first to third areas, then the waveform dimension takes a constant value. In contrast, if the small areas of interest are not areas corresponding to the first to third areas, then the waveform dimension does not take a constant value. For that reason, by focusing on the waveform dimension, the identifying unit 460c can identify the areas corresponding to the first to third areas. In the example illustrated in FIG. 18, although the predetermined period $T_n$ is set to 2, that is not the only possible case. That is, as long as the period is equal to or greater than 2, any period can be set by the administrator.

For example, it is assumed that the identifying unit 460c holds the information about the waveform dimensions corresponding to the first to third areas. Then, the identifying unit 460c compares the held information about the waveform dimensions with the waveform dimensions calculated from the small areas, and identifies the areas corresponding to the first to third areas as the target areas for extraction.

With reference to FIG. 15, when the waveform dimensions of areas 41a, 41b, and 41c of image data 40 represent the waveform dimensions of the first to third areas, respectively; the identifying unit 460c identifies the areas 41a, 41b, and 41c as the target areas for extraction.

The extracting unit 460d is a processing unit that extracts the digital watermark information from the target areas for extraction in each set of image data included in the visual information 450a. Then, the extracting unit 460d can display the extracted digital watermark information on the display unit 440 or can notify an external device about the digital watermark information via the interface unit 420. The explanation regarding the extracting unit 460d is identical to that of the extracting unit 260d according to the first embodiment.

Figure 19:
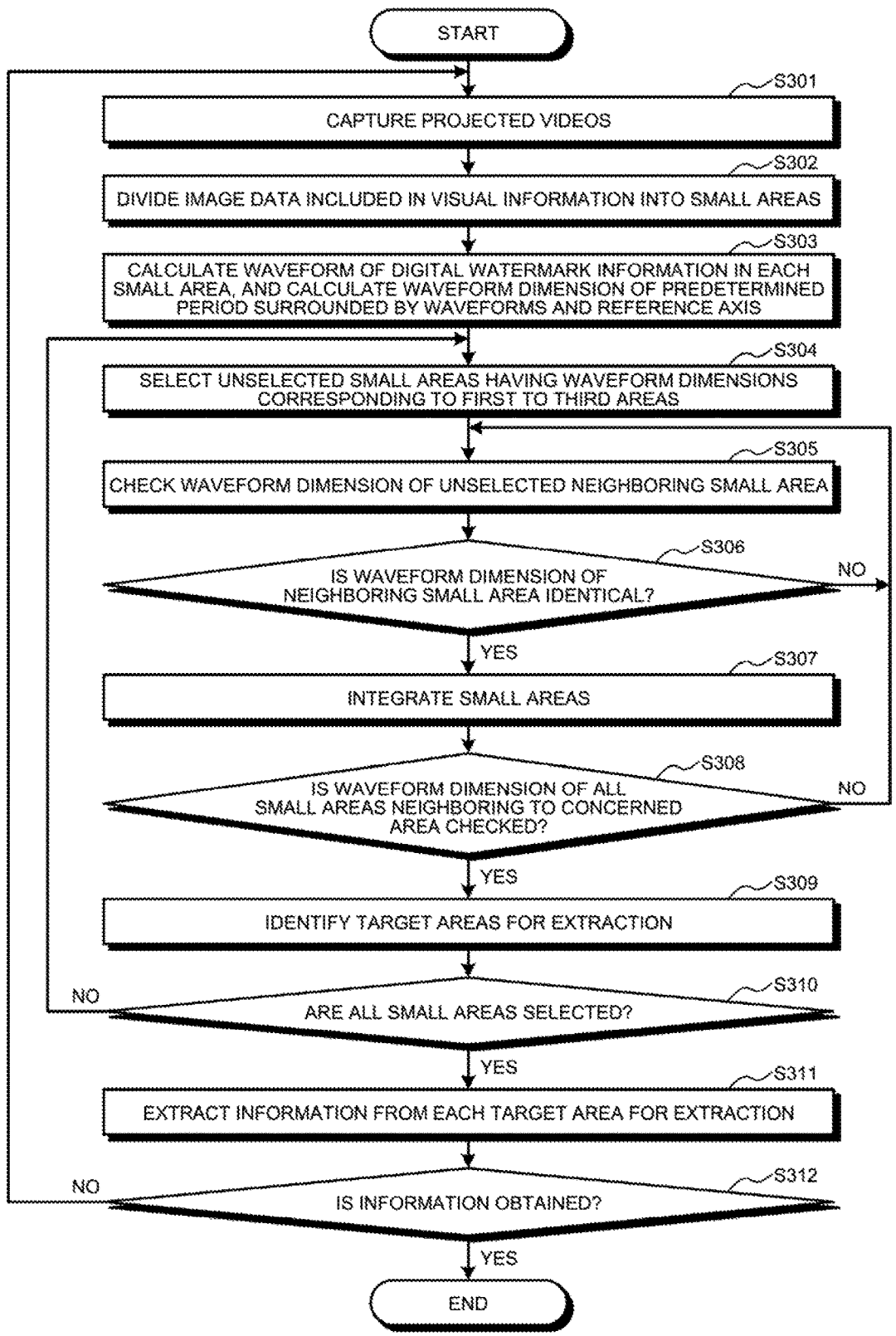
FIG. 19 is a flowchart for explaining a sequence of operations performed in the detecting device according to the second embodiment.

Given below is the explanation of a sequence of operations performed in the detecting device 400 according to the second embodiment. FIG. 19 is a flowchart for explaining a sequence of operations performed in the detecting device according to the second embodiment. As illustrated in FIG. 19, the imaging device 410 of the detecting device 400 captures the videos projected onto the embedding device 300 (Step S301).

Then, the dividing unit 460b of the detecting device 400 divides the image data included in the visual information 450a into small areas (Step S302). The identifying unit 460c of the detecting device 400 extracts the waveform of the digital watermark information for each small area and calculates the waveform dimension of a predetermined period surrounded by the waveforms and the reference axis (Step S303).

Subsequently, the identifying unit 460c selects unselected small areas having the waveform dimensions corresponding to the first to third areas (Step S304). Then, the identifying unit 460c checks the waveform dimension of the unselected neighboring small area (Step S305). Herein, the identifying unit 460c determines whether or not the waveform dimensions of the selected small areas are identical to the waveform dimension of the neighboring small area (Step S306). If the waveform dimensions of the selected small areas are not identical to the waveform dimension of the neighboring small area (No at Step S306), then the system control returns to Step S305.

On the other hand, when the waveform dimensions of the selected small areas are identical to the waveform dimension of the neighboring small area (Yes at Step S306), then the identifying unit 460c integrates the small areas (Step S307). Then, the identifying unit 460c determines whether or not the waveform dimension of all small areas neighboring to the concerned area has been checked (Step S308). If the waveform dimension of all small areas neighboring to the concerned area has not been checked (No at Step S308), then the system control returns to Step S305.

When the waveform dimension of all small areas neighboring to the concerned area is checked (Yes at Step S308), the identifying unit 460c identifies the target areas for extraction (Step S309). Meanwhile, if the identifying unit 460c has not selected all small areas (No at Step S310), then the system control returns to Stop S304.

On the other hand, if the identifying unit 460c has selected all small areas (Yes at Step S310), then the extracting unit 460d of the detecting device 400 extracts information regarding each target area for extraction (Step S311) and determines whether or not information is obtained (Step S312).

When the information is obtained (Yes at Step S312), the extracting unit 460d ends the operations. However, if the information is not obtained (No at Step S312), then the system control returns to Step S301.

Given below is the explanation about the effect of the detecting device 400 according to the second embodiment. The detecting device 400 divides the area of a projected image in which a plurality of sets of digital watermark information is embedded in a synchronized manner, and extracts the digital watermark information of each divided area. Then, the detecting device 400 extracts, at different timings, the absolute value of the value of the digital watermark information included in the small areas; and identifies the target areas for extraction based on an integral value obtained by integrating the relationship between the time and the absolute value at predetermined sections. For that reason, when three of more sets of digital watermark information interfere with each other and when the amplitude of the first to third areas is locally identical to the amplitude of the fifth area, the detecting device 400 can accurately identify the target areas for extraction.

As far as the effect of using the detecting device 400 is concerned, even in the case in which watermark signals do not overlap and are projected next to each other, it becomes possible to identify the areas. In the explanation of the effect, consider an example of detecting information from the watermark signals projected by the embedding device 100.

FIG. 20 is a diagram (3) illustrating an example of image data 50 that has been divided into a plurality of small areas. Herein, for the purpose of illustration, the area 51a projected by the lighting device 120a is defined as a first area. Moreover, the area 51b projected by the lighting device 120b is defined as a second area. Furthermore, the area in which the watermark signals projected by the lighting devices 120a and 120b do not overlap and are included next to each other is defined as a third area. Herein, the focus is on a small area 51c representing the third area. In the small area 51c, an area 52a represents the area in which watermark signals are projected by the lighting device 120a, and an area 52b represents the area in which watermark signals are projected by the lighting device 120b. When the small area 51c is assumed to have the dimension of "1", the area 52a is assumed to have the dimension of "x (0<x<1)" and the area 52b is assumed to have the dimension of "1−x".

Figure 21:
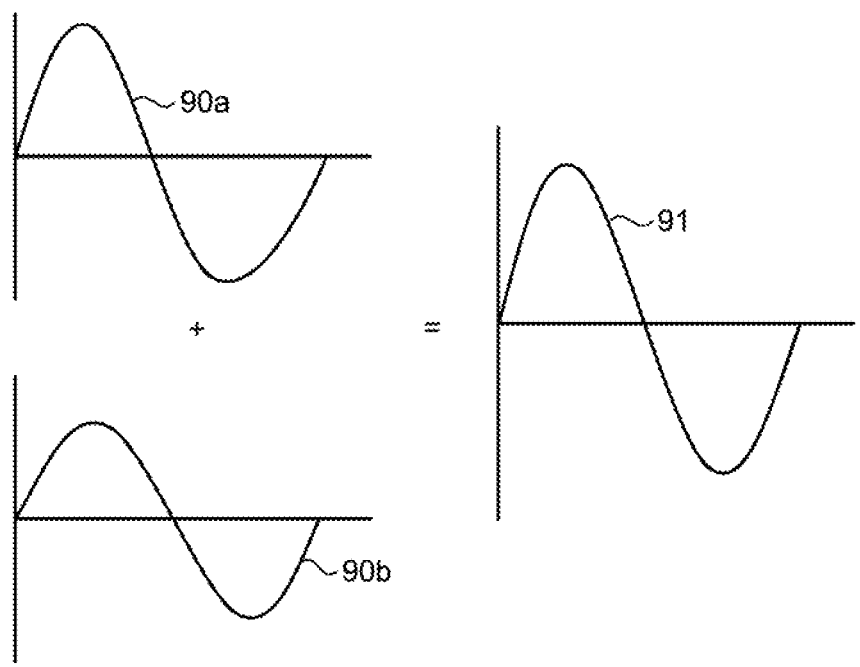
FIG. 21 is a diagram (1) for explaining the amplitude of the third area according to the second embodiment.
Figure 22:
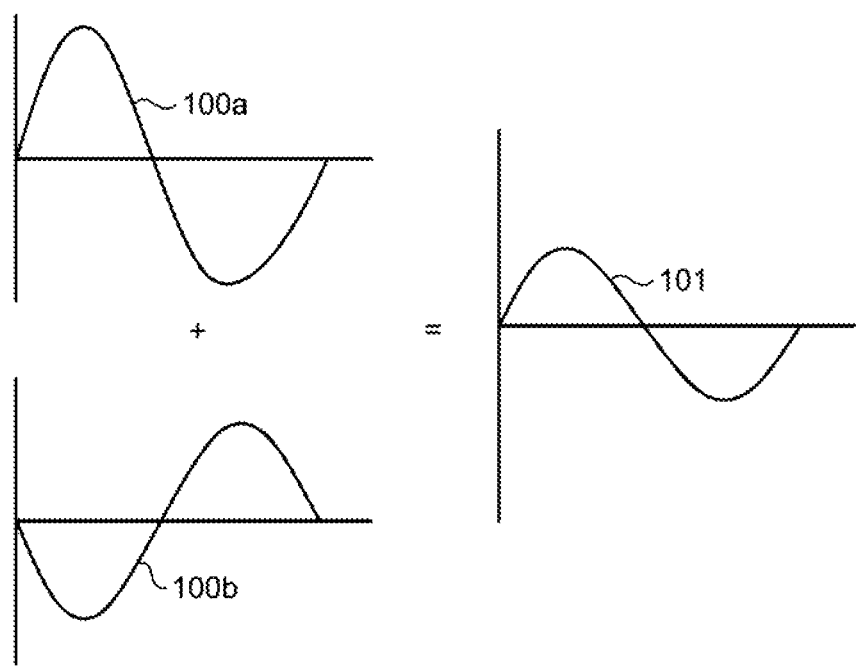
FIG. 22 is a diagram (2) for explaining the amplitude of the third area according to the second embodiment.

FIGS. 21 and 22 are diagrams for explaining the amplitude of the third area according to the second embodiment. The waveforms illustrated in FIGS. 21 and 22 are not limited to those illustrated in FIGS. 21 and 22 and can alternatively be, for example, triangular waveforms as illustrated in FIGS. 4 and 5. In FIG. 21, the horizontal axis of each graph represents the time and the vertical axis of each graph represents the amplitude size. For example, in FIG. 21, a signal 90a represents the signal in the case in which the digital watermark information included in the area 52a indicates "bit 1". Moreover, a signal 90b represents the signal in the case in which the digital watermark information included in the area 52b indicates "bit 1". As illustrated in FIG. 20, when the digital watermark information included in the areas 52a and 52b indicates "bit 1" and "bit 1", respectively; the amplitude of a signal 91 included in the third area becomes equal to the amplitude of the signals included in the first and second areas.

Figure 23:
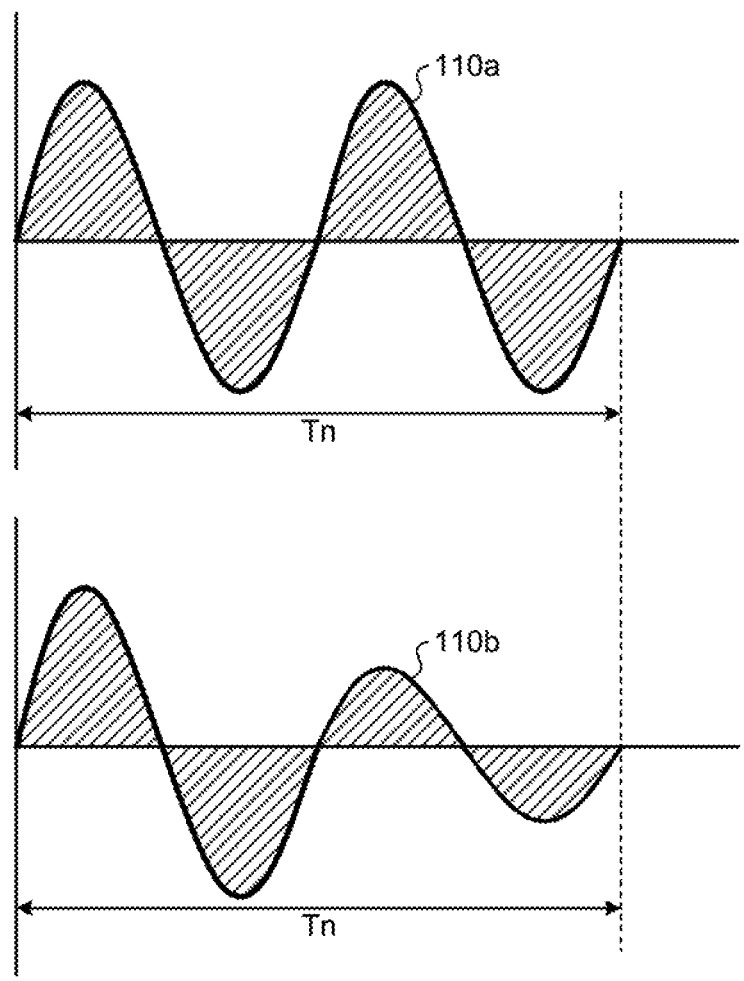
FIG. 23 is a diagram (2) for explaining the operations performed by the identifying unit according to the second embodiment.

In FIG. 22, the horizontal axis of each graph represents the time and the vertical axis of each graph represents the amplitude size. In FIG. 23, a signal 100a represents the signal in the case in which the digital watermark information included in the area 52a indicates "bit 1". Moreover, a signal 100b represents the signal in the case in which the digital watermark information included in the area 52b indicates "bit 0". As illustrated in FIG. 23, when the digital watermark information included in the areas 52a and 52b indicates "bit 1" and "bit 0", respectively; the amplitude of a signal 101 included in the third area becomes equal to |2x−1| times of the amplitude of the signals included in the first and second areas.

FIG. 23 is a diagram (2) for explaining the operations performed by the identifying unit according to the second embodiment. In FIG. 23, the horizontal axis of each graph represents the time and the vertical axis of each graph represents the amplitude size. If the small areas of interest are the areas corresponding to the first and second areas; then, for example, as illustrated by a signal 110a in FIG. 23, the amplitude takes a constant value. In contrast, if the small area of interest is the area corresponding to the third area; then, for example, as illustrated by a signal 110b in FIG. 23, the amplitude does not take a constant value. For example, if the small area is the area corresponding to the third area, the amplitude that is equal to |2x−1| times of the amplitude of the areas corresponding to the first and second areas appears on an irregular basis.

As a result of the operations performed by the identifying unit 460c and the extracting unit 460d according to a sequence of operations identical to that illustrated in FIG. 19, even in the case in which two or more digital watermarks do not overlap and are projected next to each other, the target areas for extraction can be identified with accuracy.

Meanwhile, in the first and second embodiments described above, the explanation is given for a case in which the embedding devices 100 and 300 project visual information respectively using the lighting devices 120 and 320 such as projectors. However, that is not the only possible case. Alternatively, instead of using projectors, the embedding devices 100 and 300 can use LED (Light Emitting Diode) lighting for projecting visual information.

Figure 24:
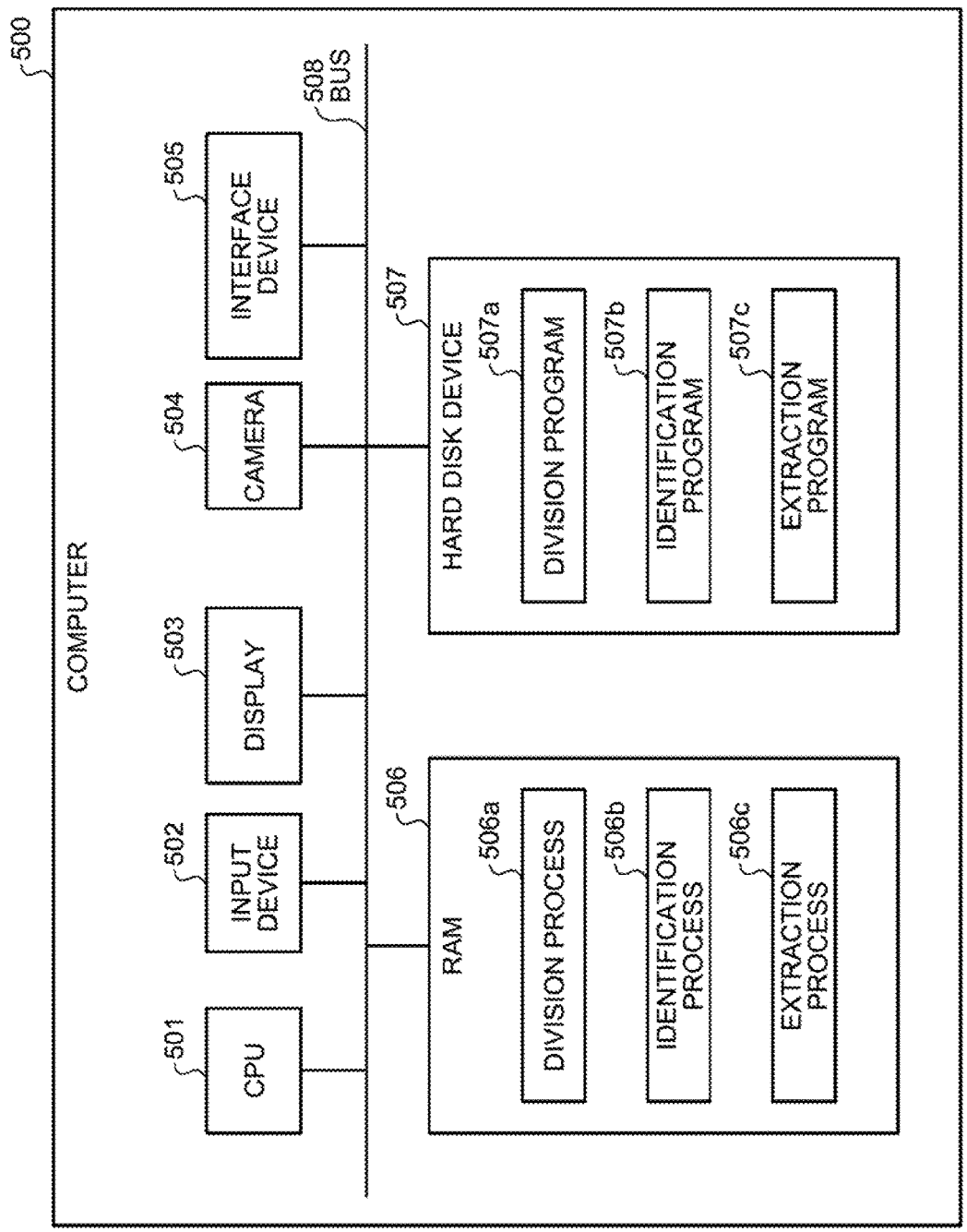
FIG. 24 is a diagram illustrating an exemplary computer that executes a digital watermark information detecting program.
Figure 25:
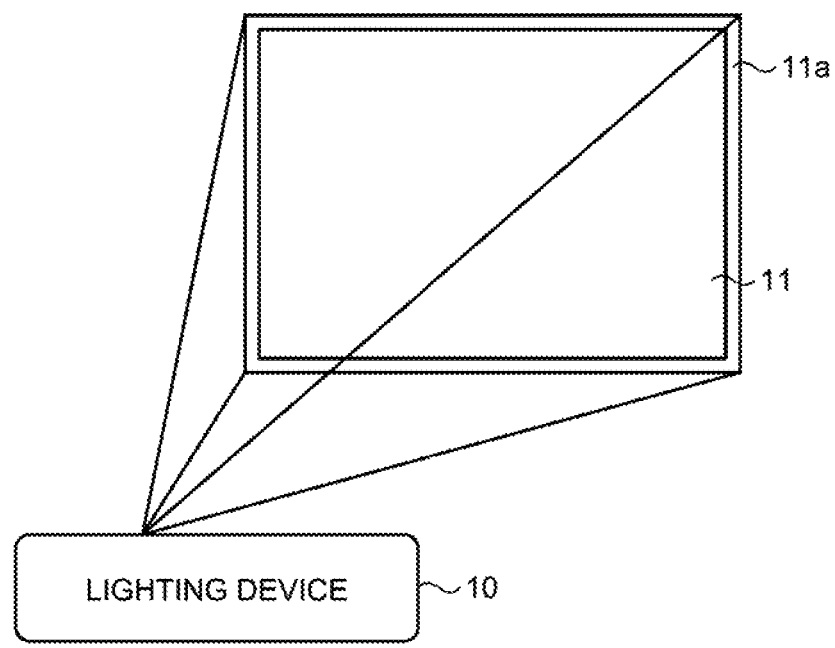
FIG. 25 is a diagram for explaining conventional technology 2.
Figure 26:
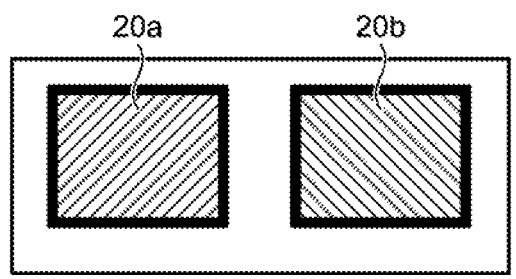
FIG. 26 is a diagram for explaining conventional technology 3.

Given below is the explanation of an exemplary computer that executes a digital watermark information detecting program for implementing functions identical to the detecting devices 200 and 400 described above. FIG. 24 is a diagram illustrating an exemplary computer that executes the digital watermark information detecting program.

As illustrated in FIG. 24, a computer 500 includes a CPU 501 that performs various computations, an input device 502 that receives input of data from the user, and a display 503. Moreover, the computer 500 includes a camera 504 that captures videos, and an interface device 505 that communicates data with other computers via a network. Furthermore, the computer 500 includes a RAM 506 that is used to temporarily store a variety of information, and a hard disk device 507. The devices 501 to 507 are connected to a bus 508.

The hard disk device 507 is used to store a division program 507a, an identification program 507b, and an extraction program 507c. The CPU 501 reads the division program 507a, the identification program 507b, and the extraction program 507c; and loads them in the RAM 506. The division program 507a functions as a division process 506a. The identification program 507b functions as an identification process 506b. The extraction program 507c functions as an extraction process 506c.

The division process 506a corresponds to the dividing units 260b and 460b. The identification process 506b corresponds to the identifying units 260c and 460c. The extraction process 506c corresponds to the extracting units 260d and 460d.

The division program 507a, the identification program 207b, and the extraction program 207c need not be stored in the hard disk device 507 from the beginning. Alternatively, for example, the programs are stored in a "portable physical medium" such as a flexible disk (FD), a CD-ROM, a DVD, a magneto-optical disk, or an IC card that is inserted in the computer 500. Then, the computer 500 can read and execute the programs 507a to 507c.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

According to a first embodiment of the present invention, in the case in which a plurality of sets of image data having embedding information embedded therein is emitted and different sets of embedding information interfere with each other, such areas in which only particular embedding data is overlapping can be identified and the information can be obtained.

What is claimed is:

1. A digital watermark information detecting device comprising:
 a processor that executes a process comprising:
  dividing image data into a plurality of areas, wherein the image data includes first image data and second image data that are respectively projected by a first projecting device and a second protecting device, the image data is captured by an imaging device, in the first image data and the second image data, first watermark information and second watermark information are respectively embedded, the first watermark information and the second watermark information are each represented by a string of first-type information or second-type information and are respectively embedded in the first image data and the second image data as first watermark data and second watermark data that temporally change each period with a constant amplitude to represent the first-type information, or the second-type information by a reversed phase of a phase for the first-type information, and the first watermark data and the second watermark data are so projected by the first projecting device and the second projecting device as to be synchronized with each other;

first extracting an amplitude of the first watermark data in an area among the plurality of areas;

identifying other areas that are adjacent with each other, wherein at least one of the other areas is adjacent to the area, and in the other areas the first watermark data changes in phase with a same amplitude that is extracted as the area, identifying the area and the identified other areas, as a first target area for extraction, and identifying a second target area for extraction as to the second image data; and second extracting the first watermark information which is embedded in the first target area for extraction and the second watermark information which is embedded in the second target area for extraction.

2. The digital watermark information detecting device according to claim 1, wherein the identifying identifies the first target area for extraction based on an integral value of absolute values of the first watermark data in each of the plurality of areas for a predetermined time period.

3. A digital watermark information detecting method comprising:

dividing image data into a plurality of areas, wherein the image data includes first image data and second image data that are respectively projected by a first projecting device and a second projecting device, the image data is captured by an imaging device, in the first image data and the second image data, first watermark information and second watermark information are respectively embedded, the first watermark information and the second watermark information are each represented by a string of first-type information or second-type information and are respectively embedded in the first image data and the second image data as first watermark data and second watermark data that temporally change each period with a constant amplitude to represent the first-type information, or the second-type information by a reversed phase of a phase for the first-type information, and the first watermark data and the second watermark data are so projected by the first projecting device and the second projecting device as to be synchronized with each other, using a processor;

first extracting an amplitude of the first watermark data in an area among the plurality of areas, using the processor;

identifying other areas that are adjacent with each other, wherein at least one of the other areas is adjacent to the area, and in the other areas the first watermark data changes in phase with a same amplitude that is extracted as the area, identifying the area and the identified other areas, as a first target area for extraction, and identifying a second target area for extraction as to the second image data, using the processor; and second extracting the first watermark information which is embedded in the first target area for extraction and the second watermark information which is embedded in the second target area for extraction, using the processor.

* * * * *